US006196181B1

(12) United States Patent
Pong

(10) Patent No.: US 6,196,181 B1
(45) Date of Patent: *Mar. 6, 2001

(54) COMPACT INTERNAL COMBUSTION ENGINE

(75) Inventor: Alex Pong, Langley, WA (US)

(73) Assignee: Evestar Technologies, Incorporated, West Palm Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/398,174

(22) Filed: Sep. 17, 1999

Related U.S. Application Data

(63) Continuation of application No. 08/900,103, filed on Jul. 25, 1997.
(51) Int. Cl.[7] .................................................. F02F 7/00
(52) U.S. Cl. ................... 123/195 R; 123/41.44; 123/90.48; 123/198 C
(58) Field of Search .................. 123/195 R, 193.2, 123/90.48, 193.4, 198 C

(56) References Cited

U.S. PATENT DOCUMENTS 2,491,630 * 12/1949 Voorhies .......................... 123/195 R

* cited by examiner

Primary Examiner—Noah P. Kamen
(74) Attorney, Agent, or Firm—Baker Botts L.L.P.

(57) ABSTRACT

An engine which employs a cam follower mechanism to reduce wear and reduce the size of an assembled engine. The cam follower mechanism utilizes guide rails located to reduce side thrust on the valve stem. The engine employs a high speed quill shaft to synchronize independent cam shafts existing in each of a plurality of interconnected engines. The engine is assembled using a single size fastener to provide a uniform stress gradient within the engine. The engines are interconnected utilizing O-ring seals. The engine provides a piston crown utilizing a connecting rod directly connected to the bottom surface of the piston crown. The piston crown is stabilized along the longitudinal cylinder axis by a rail guide. Connecting rods are provided which require less than one hundred eighty degrees (180°) circumference of a crankshaft pin for support so that a plurality of connecting rods can be associated with a single crankshaft pin. A tabbed bearing fits under the plurality of connecting rods to provide lubrication between the connecting rods and the crankshaft pin. Connecting rods are held to the crankshaft pin by a circular retaining ring. The engine provides a separate cylinder head and cylinder which are attached via a circular deformable retaining band to form a metal to metal seal. The engine provides an independent lubrication system in each engine. Coolant or lubricant is provided to each engine in parallel so that the temperature of the coolant entering each engine is the same. A large diameter modular crankshaft is provided.

16 Claims, 29 Drawing Sheets

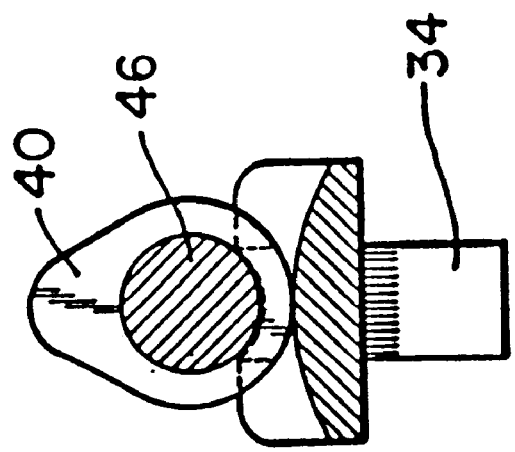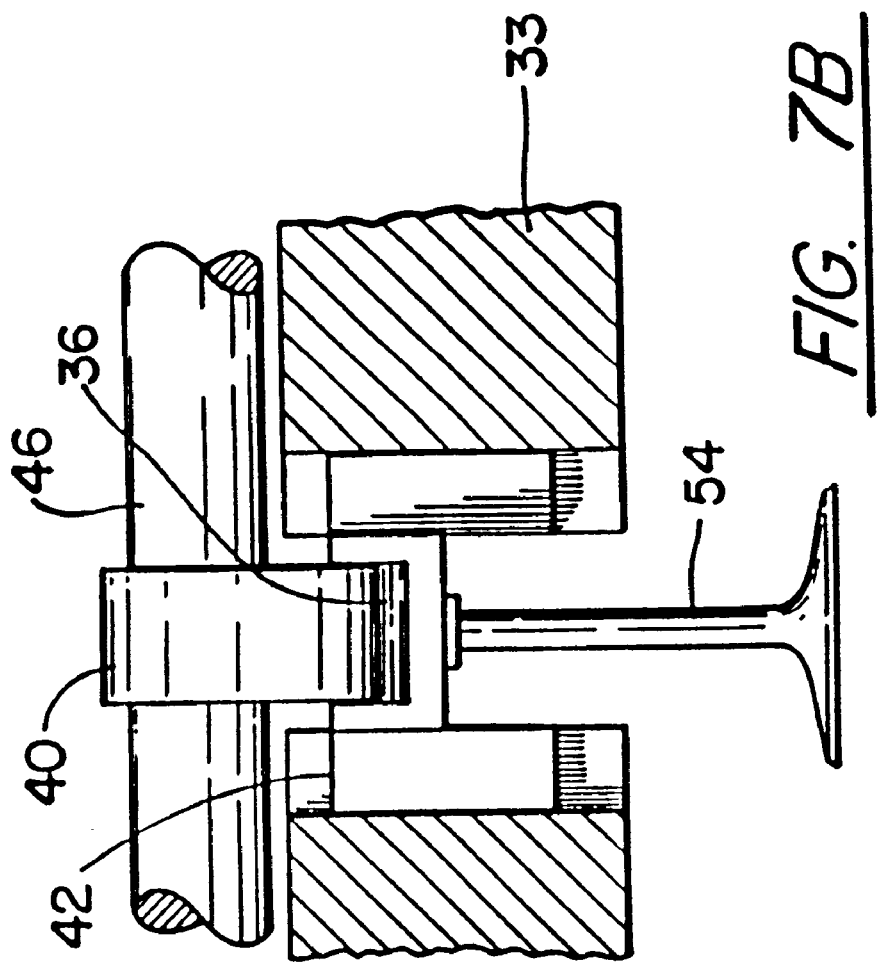
FIG. 7B
FIG. 7C

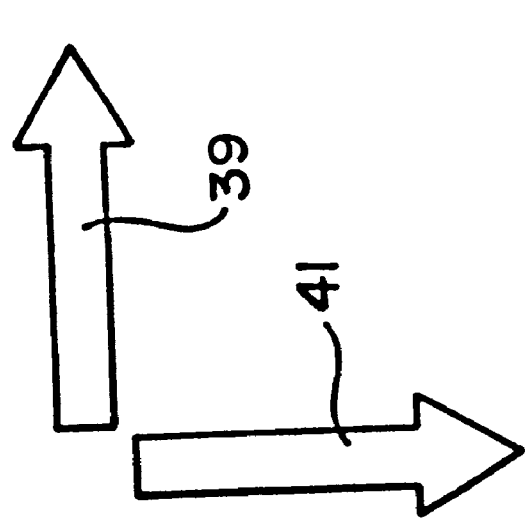
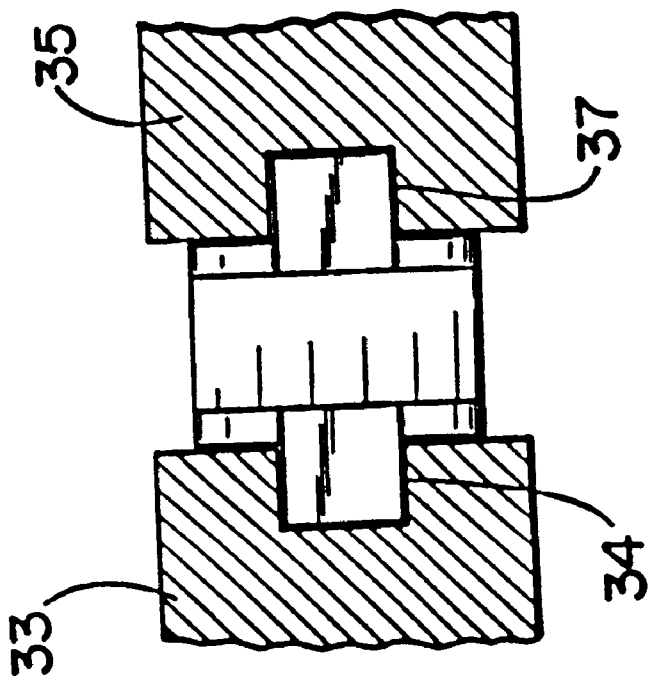

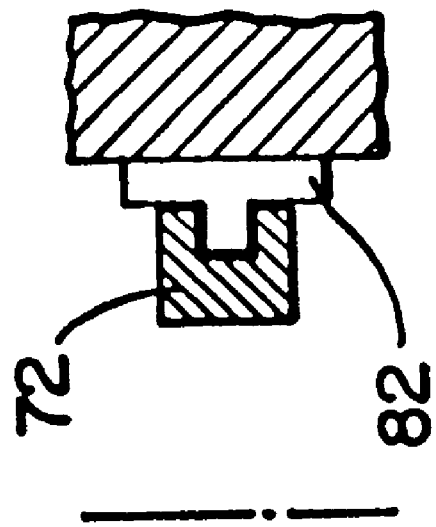
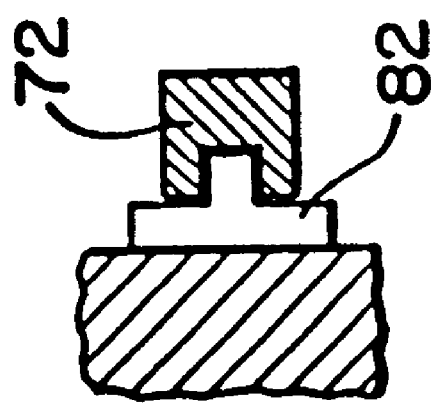
FIG. 13C

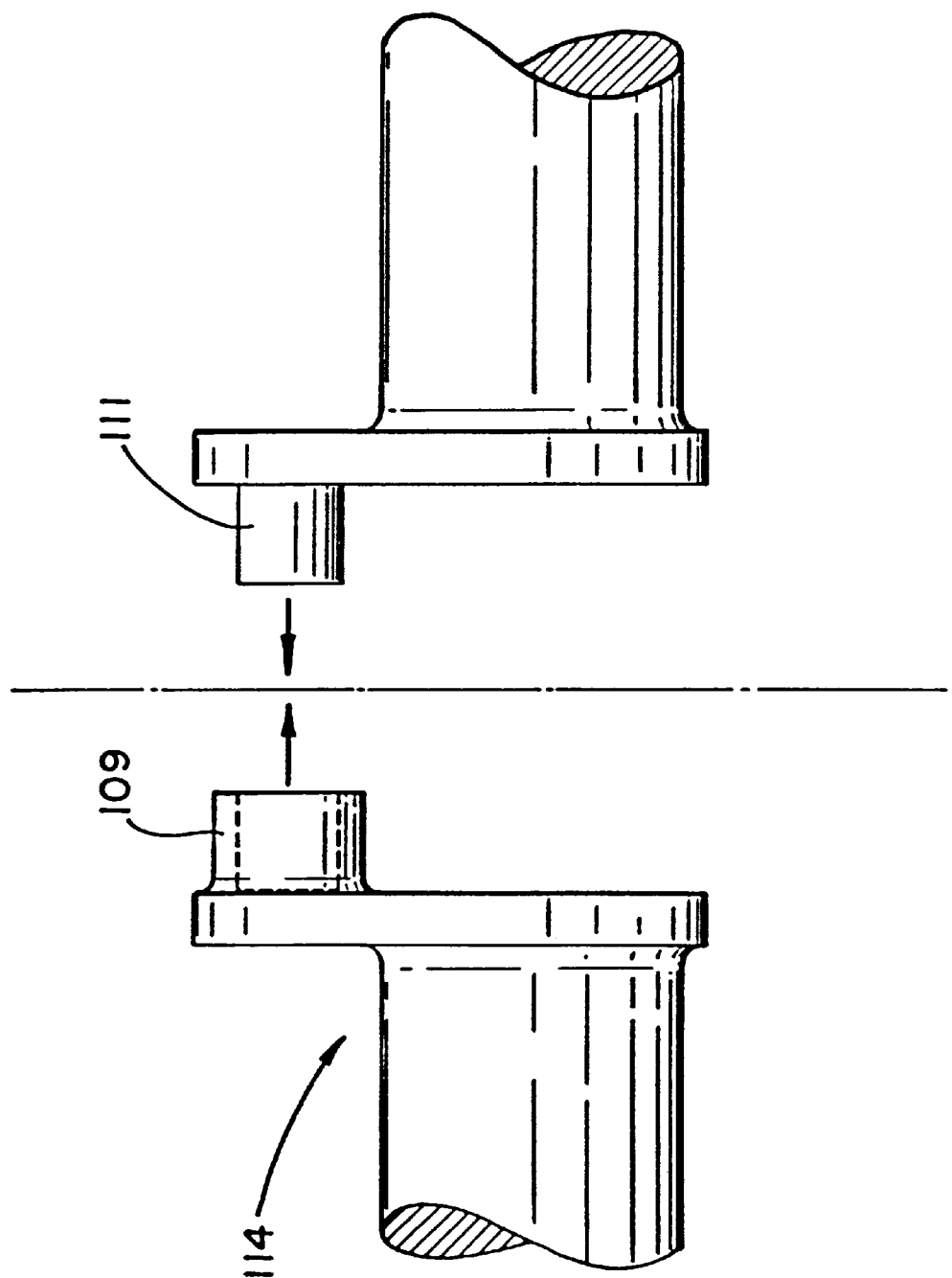

COMPACT INTERNAL COMBUSTION ENGINE

This application is a continuation of U.S. application Ser. No. 08/900,103, filed Jul. 25, 1997.

BACKGROUND

1. Field of the Invention

The present invention relates to internal combustion reciprocating engines and in particular to a reduced size internal combustion reciprocating engine of which a plurality can be interconnected to form a larger engine.

2. Description of the Related Art

Internal combustion reciprocating engines have been known for over a century. The internal combustion reciprocating engine has been manufactured in numerous configurations over the years. These engines are utilized in automobiles, air planes and water craft. An important consideration in each of these applications is the size and weight of the engine. There is a trade off between the structural integrity or durability of an engine and the size and weight of the engine. Engine manufacturers design overly massive engine parts to increase the durability and useful life of an engine. Utilization of massive engine parts, however, increases the weight and size of the engine and can actually increase engine wear by increasing the dynamic weight of the moving parts in the engine. Thus there is a need for a reduced weight and size engine that is durable.

Some engine manufacturers have apparently built engines by interconnecting a set of smaller engines or modular engines. Modular engines are known in the prior art as evidenced by the Voorhies patent, U.S. Pat. No. 2,491,630, entitled "An Engine Constructed of Sections Bolted Together Along the Vertical Plane to Form an Entire Head Block and Crankcase Thereof," issued on Dec. 20, 1949. Voorhies patented an internal combustion engine constructed from a series of engine modules. The Voorhies engine however suffers the same inadequacies as other conventional engine designs.

Some of the problems presented by typical engine designs are discussed below.

Cam Followers

Typical cam follower mechanisms act as an intermediary between a cam shaft lobe and a valve stem. Cam followers compensate for rotating cam lobes side thrust. Lobes assert a composite thrust containing both a horizontal (side thrust) and vertical (downward thrust) component. The cam followers absorbs some of the side thrust. Any portion of this horizontal thrust component which is asserted on the valve stem increases wear on the valve stem and valve stem guide in which the valve stem slides. The horizontal and vertical components are asserted upon the cam follower by the rotating cam lobe. The cam lobe rotates, depresses the cam follower mechanism, which in turn depresses the valve stem. Typically a portion of the side thrust component is not compensated for by the cam follower. This side thrust is asserted on the valve stem which increases wear on the valve stem and the valve stem guide.

Typical engine designs typically provide minimal lubrication between the valve stem and the valve stem guide. Inadequate lubrication exacerbates the effect of wear caused by the side thrust asserted on a valve stem by the typical cam follower mechanism. Typically, engine designers utilize long valve stems to provide a relatively long longitudinal dimension, or high aspect ratio of length to width, in order to achieve stability of a valve stem along its axial length.

Engine designers also consider the aspect ratio of the cup-type cam follower. The longitudinal dimension of a conventional cup-type cam follower assembly must be long enough to stabilize the cam follower along its axial length, therefore seeking to reduce the horizontal thrust exerted on the valve stem. As the cam lobe rotates and depresses the cup, the cup's resistance to the side thrust component is manifest in wear on the cup along a line 90° from the axis of rotation of the cam lobe.

In a typical cup-type cam follower, the top of the cup or cup face must have sufficient diameter to cover the valve spring. This cup configuration, thus requires a cup wide enough to cover a valve spring and long enough to be stable. The requirement for large cup increases the overall size of the assembled engine.

Crankshafts

Typical single piece and modular crankshafts have suffered harmonic breakage problems. These problems occur when the natural frequency of vibration of the modular crankshaft matches the frequency of impulses applied to the crankshaft, resulting in breakage, or can induce intolerable torsional deflections of the crankshaft.

The typical high RPM engine produces power input pulses near the frequency range of the natural resonant frequency of the typical crankshaft. Thus, typical modular crankshafts tend to suffer from breakage as the input frequency matches the natural frequency of vibration. Typical modular and single piece crankshafts may also be distorted and strained from bending moments asserted on the crankshaft by the force of the pistons pushing the crankshaft pins.

Cam Shafts

Typical cam shaft deflection has caused typical engine designers to have problems synchronizing interconnected engine modules together to achieve appropriate timing. The cam shaft twists due to the twisting torque applied to it, adversely affecting the timing and the synchronization between engine modules. Typical engine designers utilize a large cam shaft to reduce twisting of the cam shaft in an attempt to overcome timing problems. Large typical cam shaft designs, however, increases the overall size and weight of the assembled engine.

Engine Assembly

Typical engine assembly utilizes a wide array of nuts, bolts and washers of varying shapes, sizes and lengths to assemble the parts to make a typical engine. The typical engine is assembled by different fasteners each having different torque requirements for each individual part of the engine. Different fasteners and different torque create a nonuniform stress gradient on the typical assembled engine. Nonuniform stress distorts the shape of the engine. Diversity of fasteners creates inventory overhead work for the engine manufacturer. The manufacturer must keep up with a wide variety of different size nuts and bolts. Thus, a wide variety of tools are required. Typical engines are assembled utilizing a different tool and assembly procedure for each part of the engine. Typical engines also utilize gaskets between metal parts which creates an assembled tolerance variation. Gaskets variably compress to a nonuniform thicknesses according to the pressure applied to the gasket. The pressure varies at each fastener and at each fastener location. Thus the tolerance of the assembled engine can vary as the thickness of the sealing gaskets vary.

When assembling modular engines designers have found that typical engines require a different size oil pump and cooling pump for each different modular engine configuration, depending upon the number of modules connected to construct the engine. Oil pump size varies with engine size. Thus, the manufacturer must supply a different size coolant and lubrication pump for each configuration of one, two, three, four, or five typical engine modules connected together to construct an engine.

Typically lubrication and coolant fluid flow serially through interconnected engine modules so that the lubricant and coolant fluid enter the first engine module where the fluid is pre-heated by the first engine module before the fluid enters the second engine module, third module, fourth module, and so on. Thus, the fluid entering the last engine module is substantially warmer than the fluid that entered the first engine module. Thus each typical interconnected engine modules run at a different temperature.

Pistons

Typical piston assemblies utilize a trunk style piston. The trunk piston has a flat circular top and a long cylindrical body or trunk. The trunk of the conventional piston fits closely within the cylinder. The cylinder wall guides the trunk of the piston and provides for stability of the piston along the longitudinal axis of the cylinder. The trunk of the conventional piston must be long enough, relative to the diameter of the piston, to provide adequate stability. The ratio of the piston length over the piston diameter determines how stable the motion of the piston is. The trunk of the piston rubs along the cylinder wall. The cylinder wall guides the piston. The additional weight of the elongated piston trunk increases the dynamic weight of the piston, thereby increasing the accelerative forces exerted on the piston, connecting rod and crankshaft pin.

Typical pistons such as the trunk type piston, increase the overall size of the engine because the length of the cylinder must accommodate the additional length of the conventional piston trunk plus the displacement of the connecting rods. The typical trunk type piston also suffers from thermal expansion problems. Metal expands when heated. The trunk type piston swells to a large diameter when heated. Thus, the cylinder must be large enough to allow passage of the enlarged heated piston. The cylinder diameter must be large enough to maintain a substantial clearance between the cylinder wall and the piston trunk over the full range of engine operating temperatures. The clearance between the outside diameter of the conventional trunk type piston and the internal diameter of the cylinder wall must be maintained at all operating temperatures or the piston will "seize up" in the cylinder. Thus, typically, a substantial gap exists between the piston trunk and the cylinder wall to allow for variations in the diameter of the piston over the full operating temperature range of the engine. This excess gap left to allow for swelling of the piston creates a problem. At lower temperatures, there is a large gap between the piston trunk and the cylinder wall. At higher temperatures, the gap between the piston and the piston wall is very narrow. The gap between the cylinder wall and the piston trunk, varies widely over the operating range of the engine. Thus there is a variation in the stability of the piston along the longitudinal axis of the cylinder.

These thermal expansion considerations require engine manufacturers to design within close tolerances yet leave large gaps to account for wide variations in piston size over the operating temperature range. Piston stability along the longitudinal axis of the cylinder varies widely over the operating temperature range. Moreover, high tolerance requirements slow down the manufacturing process, to insure that the high tolerance is maintained. Slower manufacturing, requires additional man hours and time to produce the engine.

Connecting Rods

Typically connecting rods encircle and rotate around a crankshaft pin. The connecting rod end which attaches to the crankshaft pin must be a certain minimum width so that adequate lubrication can be established between the connecting rod end and the rotating crankshaft pin. Lubrication is in adequate below this minimum width causing increased wear and mechanical failure.

Typically engines utilize connecting rods which are open at one end and bolted to a semi circular connecting rod bracket to form a circle around a crankshaft pin. The two piece, nut and bolt connecting rod configuration requires considerable additional mass for the nuts and bolts, thereby increasing the dynamic weight and forces experienced by the crankshaft and connecting rod attached thereto.

The typical connecting rod requires considerable space. Although some engines attach more than one connecting rod to each crankshaft pin, typically the rods are side by side on a single crank pin. In this configuration, each connecting rod applies a sheer force across the entire crank pin length, a distance equal to twice the width of the connecting rod at the crank pin. The sheer force and attendant bending moment can cause bending and even breaking of the crankshaft pin.

Cylinder Head Seal

Some typical engines utilize a single piece head and cylinder assembly comprising a one-piece cylinder and cylinder head. This one-piece configuration presents a problem in machining the cylinder head. Machine bits must extend through the length of the cylinder to reach the machine surfaces of the attached cylinder head. Thus longer cutting bits must be used to reach the head. Longer bits are less rigid and thus reduce the accuracy of the head machining process.

Other engines utilize a separate cylinder and cylinder head. Engine assemblers seal the cylinder head to the cylinder formed in an engine block with large bolts and gaskets. Gaskets are subject to variable thickness, depending upon the amount of pressure applied at each bolt location which the gasket seals. Irregular tolerances in an assembled engine decreases the structural integrity of the assembled engine. For example, typically, head bolt assembly methods rely on high pressures at isolated fastener points which deforms the engine block and degredates the structural integrity of the engine. Typical head sealing methods require a complex bolt tightening pattern to exact torque requirements. Such a methodology is prone to irregular assembly.

SUMMARY OF INVENTION

In accordance with the present invention, an engine is provided comprising one, or a plurality piston cylinders. A larger engine can be constructed from a plurality of the engines by interconnecting engines. Interconnected engine modules are sealed utilizing an O-ring. The engine provided by the present invention may be assembled and interconnected with a plurality of engines utilizing a single size uniform fastener.

In accordance with the present invention, a modular crankshaft is provided having a crank pin comprising male and female portions. The male and female portions interconnect to form a crank pin. The connections also link crankshaft sections together. The male and female sections are splined together.

In accordance with the present invention, a piston is provided comprising a piston having a crown. A rail guide assembly is attached to the bottom of the piston crown. The piston rail guide assembly rides on guides formed on the engine block in which the piston resides. The piston rail guide assembly stabilizes the piston crown so that the piston crown face remains perpendicular to the longitudinal axis of the cylinder in which it reciprocates. The piston is substantially smaller than the cylinder in which it resides which reduces wear on the cylinder wall. The piston crown center is guided along the center of the cylinder by thrust pads. Thrust pads attached to the bottom of the piston crown slide along the cylinder wall to guide the center of the piston crown within the center of the cylinder.

In accordance with the present invention, a connecting rod is provided which at one end fits around a crankshaft pin and at the other end attaches to the bottom of the piston crown. The connecting rod does not fully encircle the crankshaft pin so that a plurality of connecting rods are held in place by a retaining ring which encircles a single crankshaft pin within the width of a single connecting rod. Connecting a plurality of connecting rods within the width of a single connecting rod on a single crankshaft pin, shortens the overall length of the crankshaft. A shorter crankshaft suffers less distortion during operation.

The other end or small end of the connecting rod is rotatably attached to the bottom of the piston crown. The piston crown rail guide fits over and retains the small end of the connecting rod and a connecting pin. The connecting rods rotate about the connecting pin which abuts the bottom surface of the piston crown. The rail guide fits over and retains the connecting rod and pin under the piston crown. The connecting rod assembly shortens the overall dimensions of an engine and reduces wear on the connecting pin.

In accordance with the present invention, a cam shaft is provided. The present invention provides a quill shaft which synchronizes the timing of separate and independent cam shafts which are provided in each of the separate but interconnected engines.

In accordance with the present invention, a lubrication and cooling system is provided within each engine. Thus, a series of interconnected engines are inherently equipped with an appropriate lubrication and cooling system. In accordance with the present invention a valve head is provided which fits into the halves of an engine module. These and other provisions of the present invention are illustrated in the following description.

The engine of the present invention provides a plurality which maybe duplicated to provide identical compact engines which may be interconnected to form a larger engine. Each engine contains either one, two, three or more cylinders. An eight cylinder engine can be constructed by interconnecting two four-cylinder engines or by interconnecting four two-cylinder engines.

The engines are easily interconnected in metal to metal contact utilizing uniform fasteners and O-rings to form seals between interconnected modules. The uniform fastener reduces assembly time and helps to standardize assembly tools and methods. The modular engine uses a plurality of identical fasteners to assemble the entire engine.

The engine of the present invention provides a cam follower apparatus that is configured to reduce the overall size of an engine while greatly increasing the allowable margin of error during the manufacturing process. Guide rails are provided on the cam follower body which attenuate the horizontal side thrust component of the cam lobe thrust, so that the valve stem is actuated essentially by only the vertical thrust which acts parallel to the valve stem's longitudinal axis of motion, reducing wear.

The engine of the present invention provides a cam shaft in each engine module. The cam shaft in each engine module is synchronized with the cam shafts in other interconnected engine modules by use of an external high RPM quill shaft. The cam shafts are geared to the high speed quill shaft which reduces timing errors induced by twisting of the cam shaft.

The engine of the present invention is assembled utilizing a plurality of uniform fasteners. Using a single fastener reduces the manufacture's requirement for inventorying of different size and length nuts and bolts. Uniform fasteners also simplify engine assembly methods. The uniform fastener enables the present invention to utilize a large number of uniform fasteners which evenly distribute the forces applied to the engine across the engine structure.

The engine of the present invention provides a piston crown which utilizes thrust pads to center the piston crown within the center of a cylinder. Guide rails which run within guide slots are attached to the piston crown. These guide rails keep the piston crown face stable along the longitudinal axis of the cylinder. The stabilizing influence of the piston guide rails eliminates the need for the long piston trunk typically used in engines. The piston enables an engine manufacturer to assemble an engine which is smaller than a typical engine with the same stroke. This present invention provides a structure which reduces or eliminates the bending moment of the shear force acting on the connecting rod pin. Thus, the size and weight requirements for the connecting rod pin is reduced. The reduced size and weight of the pin connecting rod assembly reduces the dynamic weight and wear on the pin during operation of the piston assembly.

The placement of the connecting rod abutting the lower surface of the piston crown enables the connecting rod to pivot close to the piston crown upper face. This configuration shortens the distance between the connecting rod end and the piston crown upper surface, which provides an engine smaller than a typical engine with the same stroke. Thrust pads are utilized to maintain the piston crown within the center of the cylinder.

In the engine of the present invention, a plurality of connecting rod ends are connected to a crankshaft pin. The connecting rod end has substantially the same diameter and radius curvature as the crankshaft pin. A circular bearing between the crankshaft pin and the connecting rod end facilitates lubrication. A set of retaining rings is provided to maintain contact between the crankshaft pin and the connecting rod end assembly.

Attaching more than one connecting rod end to a single crankshaft pin reduces the overall length of the crankshaft,, which reduces the bending moment of the shear forces applied to the crankshaft by the pistons through the connecting rods. Reducing the bending moments induced in the crankshaft pins, by reducing their length overall, increases the structural integrity of the crankshaft during operation. The crankshaft is shorter than a typical crankshaft.

The present invention provides a large diameter crank pins and crankshaft to reduce twisting and torsional deflections induced in the crankshaft. A tab-on the connecting rod bearing restricts the rotational motion of the bearing relative to the connecting rod ends so that oil supply apertures in the tabbed bearing are not exposed to the gaps between the connecting rod ends.

Cylinder Head Seal

The cylinder head of the present invention is configured to facilitate machining of the intake ports, exhaust ports and valve guides in the cylinder head. The top of the cylinder is cut at an angle so that the line at the top edge of the angled cylinder edge creates a high loading when pressure is applied. This enables the angled cylinder edge to form a metal to metal seal against the cylinder head. A circumferential land around the cylinder, circumferential land around the cylinder head and a retaining band are utilized to attach and seal the cylinder to the cylinder head. the retaining ring and lands fit into a receiving grove cut in each engine block half.

Lubrication System

The engine of the present invention provides an independent lubrication system for each engine. Each engine contains its own independent lubrication and cooling system comprising a coolant pump, a scavenger pump, and a pressure pump. The oil supply is manifolded in parallel to each engine so that each engine is supplied with oil at the same temperature. Each engine module runs at the same temperature. A plurality of modules connected together to form an extended modular engine will have an appropriate lubrication system. A main supply line from the oil radiator outlet is manifolded in parallel through a constant temperature line into each of the engines so that the temperature of the oil at each engine is the same.

Crankshaft

The crankshaft is comprised of a plurality of modules which interconnect in a male-female fashion to form a crankshaft. The male-female crankshaft connections are splined together for rotational stability. The crankshaft is made of a stiff material with a large diameter so that the natural frequency of vibration of the crankshaft is much higher than the frequency of the rotational impulses applied to the crankshaft by the low RPM engine. Thus, the frequency of piston impulses does not enter the range of the crankshaft's natural frequency of vibration. This substantially reduces the probability of harmonic breakage problems due to piston impulses matching the natural frequency of vibration in a crankshaft.

Valves

The cylinder head of the present invention uses three intake and three exhaust valves for each cylinder.

Other advantages and features of the invention will be apparent after studying the following description of a preferred embodiment.

BRIEF DESCRIPTION OF THE DRAWINGS

FIG. 7B is an elevation of the cam follower shown in FIG. 7A in contact with a cam shaft lobe.

FIG. 7C is an elevation of a cam lobe and follower according to the invention.

FIG. 7D is a plan view in direction 7D illustrated in FIGS. 7A and 7B.

FIG. 7E is a force vector diagram.

FIG. 13C is a section taken along line 13C—13C in FIG. 13B.

FIG. 20 is a plan view of two disassembled sections of the male and female crank pin sections of a crankshaft according to the invention.

DESCRIPTION OF AN EXAMPLE OF A PREFERRED EMBODIMENT OF THE INVENTION

Figure 1:
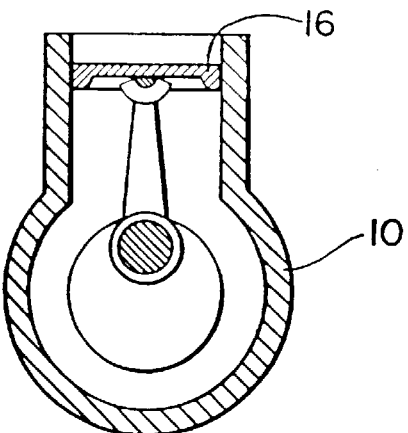
FIG. 1 is a cross section of a single piston engine module embodying the invention.
Figure 2:
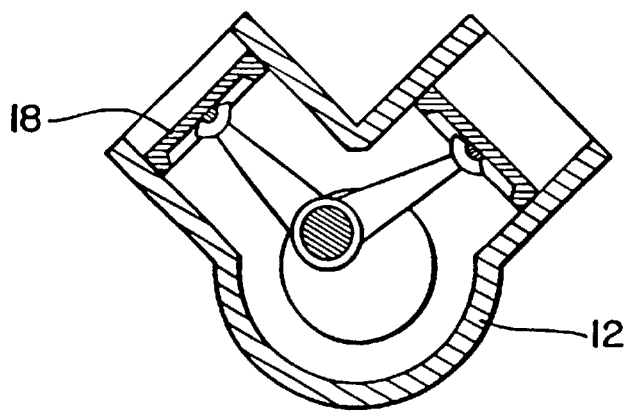
FIG. 2 is a cross section of a dual piston engine module embodying the invention.
Figure 3:
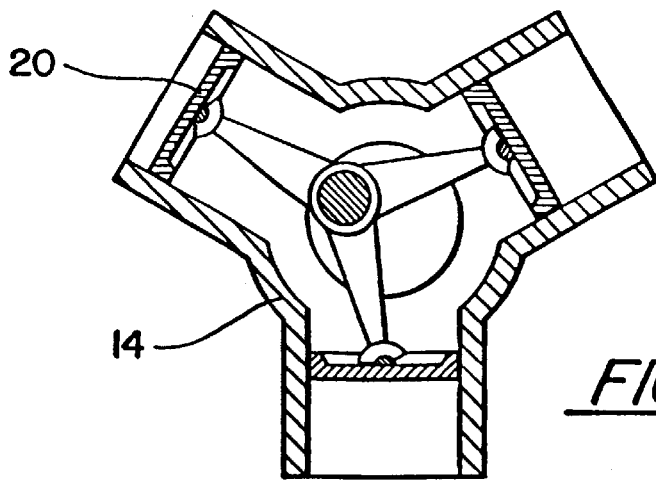
FIG. 3 is a cross section of a three piston engine module embodying the present invention
Figure 4:
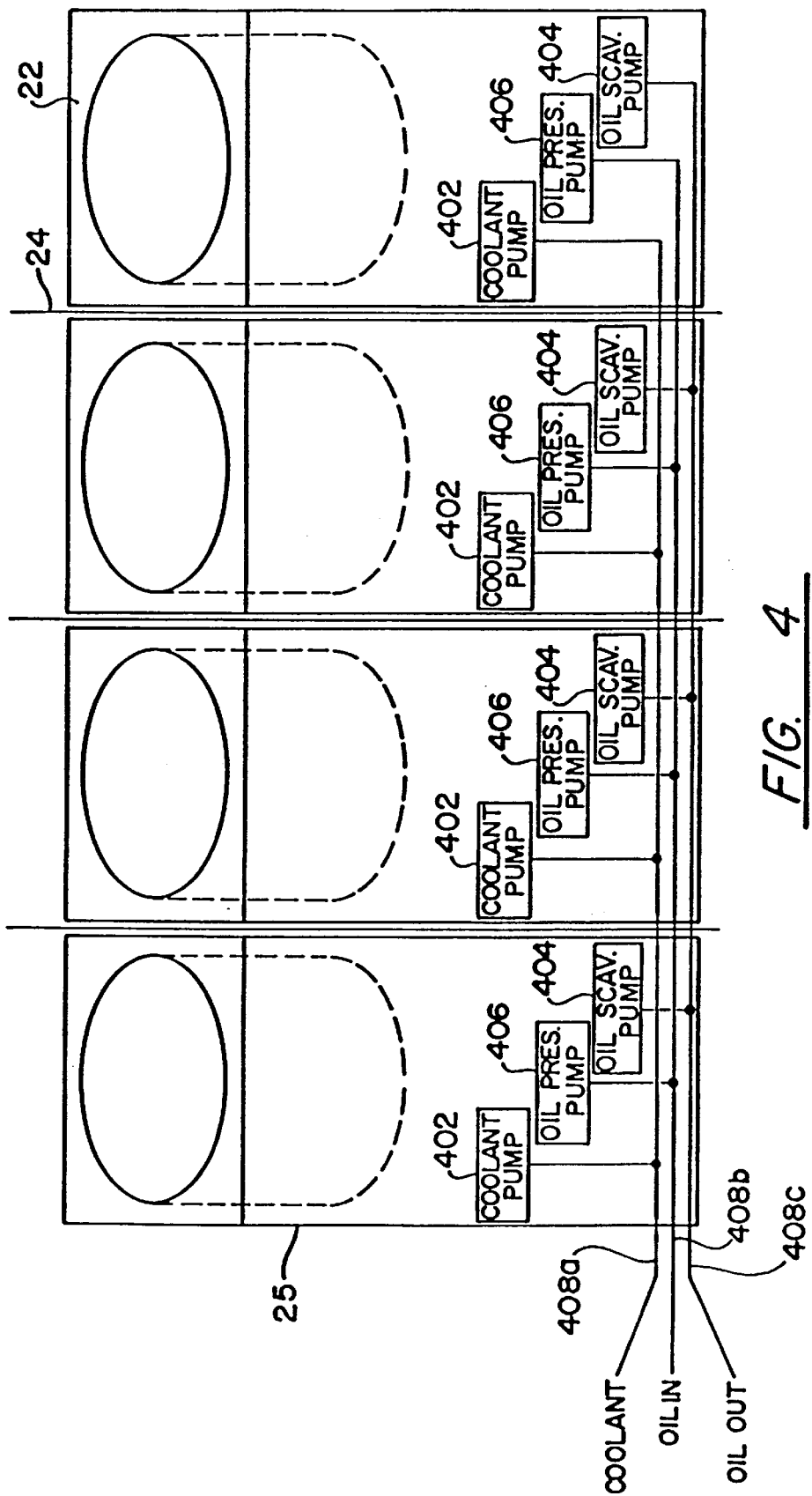
FIG. 4 is a simplified plan view of four engine modules connected together according to the present invention.

Turning now to FIG. 1, in the present example of, a preferred embodiment of the invention, the engine of the present invention provides a plurality of identical engines which may be interconnected to form a larger engine. As shown in FIG. 1, each engine contains either one 10, two 12, three 14 cylinders or more. Each cylinder houses a piston, e.g. 16, 18, 20. As shown in FIG. 4, these individual engines may be interconnected by abutting the planer surfaces 26 located mid-way 24 between the axial separation of the cylinders in adjacent modules. Each engine provides one piston 16, two pistons 18, or three pistons 20. The engines run independently or may be interconnected to work in cooperation.

An eight cylinder engine can be constructed by interconnecting four two-cylinder modules 12 or eight one-cylinder modules 10. As shown in FIG. 4, the engines are interconnected utilizing metal to metal contact at the axial plane 24 mid-way between adjacent cylinders 22. A metal to metal contact is formed between the adjacent planer surfaces 26 utilizing uniform fasteners discussed below. An O-ring groove is fashioned in the planer surface 26 of each engine. The O-ring is placed in the O-ring groove to form an O-ring seal between adjacent interconnected engines.

Figure 5:
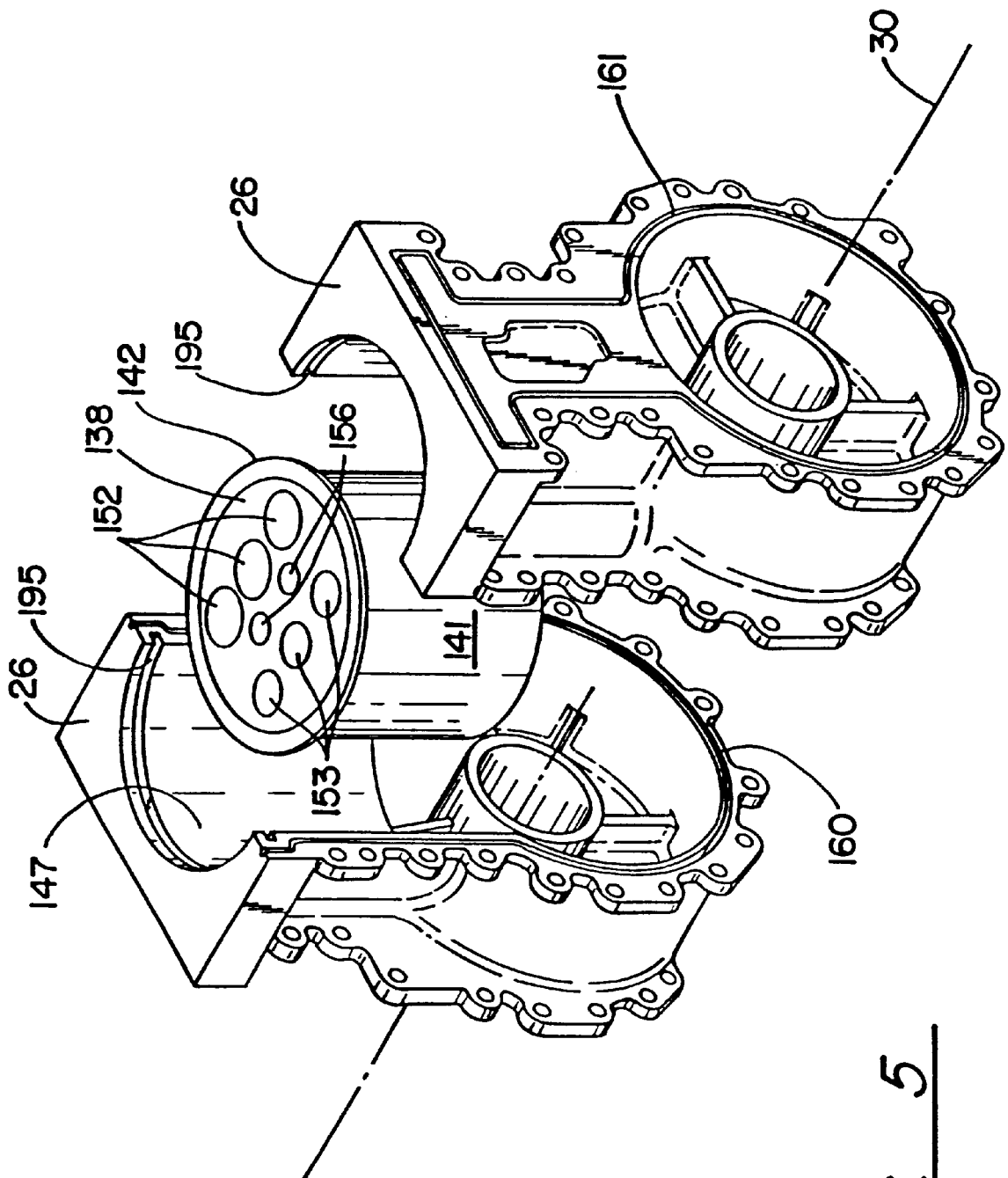
FIG. 5 is an exploded view of an engine module embodying the invention.

As shown in FIG. 5, each engine is split into two halves 26 on a plane perpendicular to the longitudinal axis of the crankshaft A cylinder head 138 and cylinder 141 are fastened together with a retaining ring 142 that fits into the groove 195 and is secured when the two halves 26 are brought together (see FIGS. 22, 23A, 23B and 24) engine utilizes a piston crown and piston guide rail assembly, rather than a trunk type piston. The piston crown assembly enables a designer to reduce the size of the engine and prolongs engine life by reducing induced wear. The piston crown assembly is stabilized by guide rails and thrust pads instead of the piston trunk.

Figure 6:
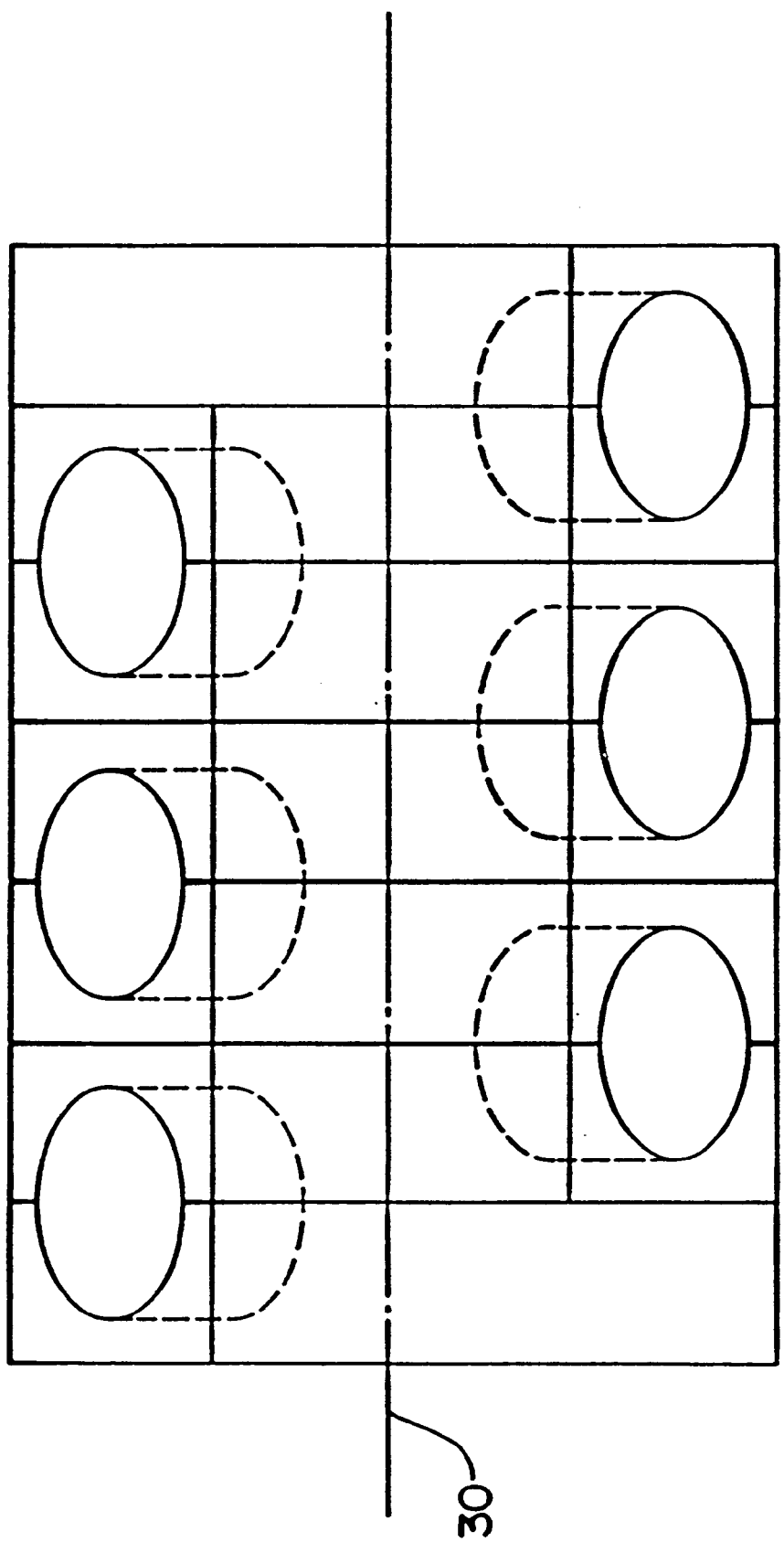
FIG. 6 is a simplified schematic of a multi-cylinder intermeshed set of engine modules showing pistons in dotted lines.

Referring to FIG. 6, the cylinder spacing within an engine is configured so that an engine can be intermeshed with an adjacent engine. The split plane of one engine becomes the separation plane between the intermeshing engines. Single cylinder engines can be interlaced into 2 cylinders, 4 cylinders, 6 cylinders, etc., configurations. Three cylinder configure engines can be similarly interlaced as 3 cylinders, 6 cylinders, 9 cylinders, 12 cylinders, etc., engine configurations. In the case of the meshed configuration engine, an extra crank throw is introduced between bearings. All other interfaces remain identical, differing only in axial dimension.

In the present example of a preferred embodiment of the present invention, each engine provides a lubrication and coolant system and a cam follower apparatus. When a plurality of engines are interconnected, it becomes desirable to synchronize the firing of the pistons in the individual engines. Synchronizing enables proper timing of the overall composite engine composed of a plurality of engines running in synchronization. Therefore, the individual cam shafts in each engine are synchronized. In the present example of a preferred embodiment of the present invention, synchronization between the plurality of engines interconnected is facilitated by an external high RPM quill shaft, discussed below.

In the present example of a preferred embodiment of the present invention, the engine utilizes a guide slot to stabilize the piston and guide rails to stabilize the cam follower mechanisms along their respective axis of translation. The guide slots and rail guides of the present invention are compact and require less space to perform their respective function than typical equivalents. Compact design for the guide slots and rail guides reduce the overall size of the engine and prolong its useful life.

Figure 27:
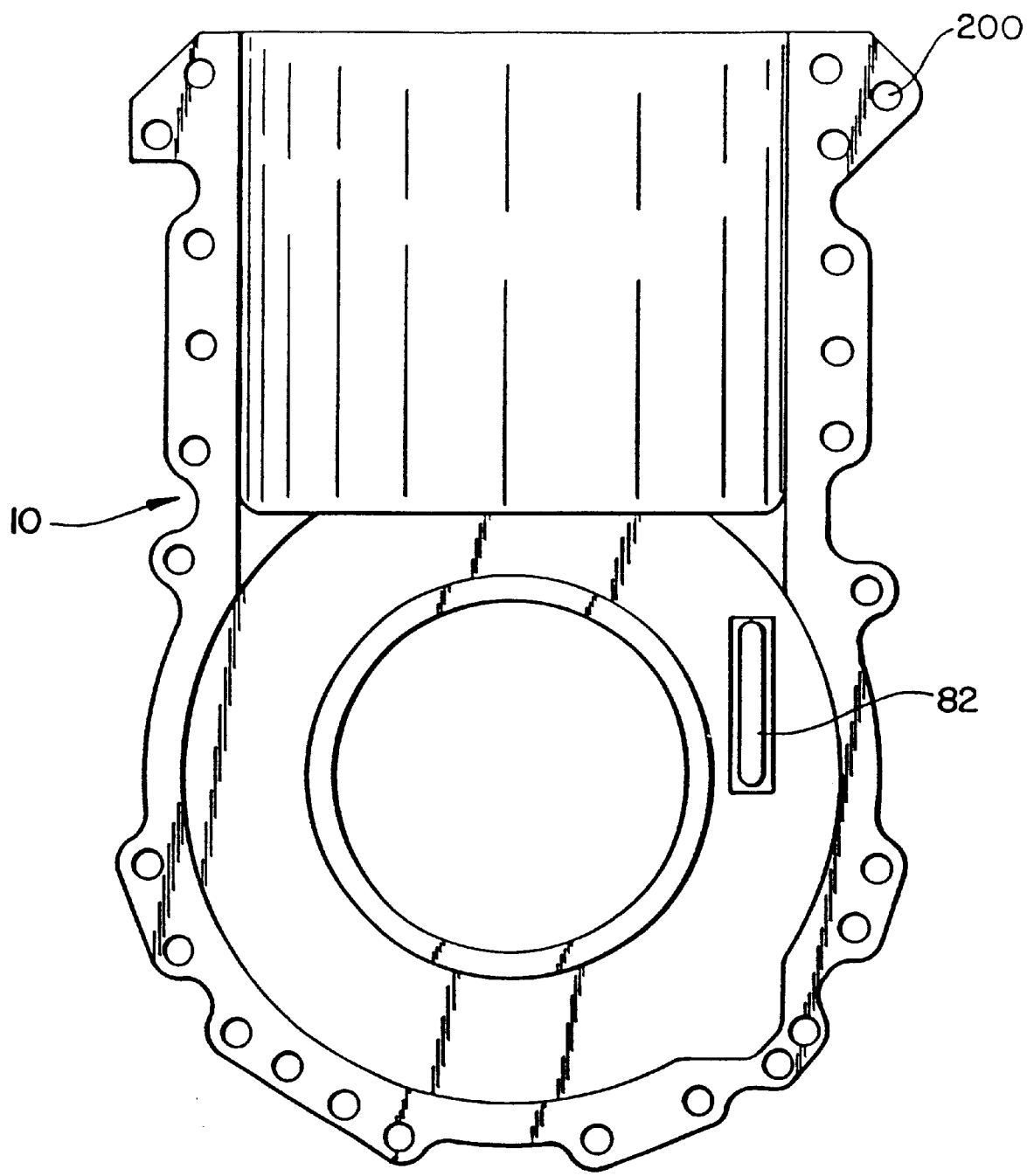
FIG. 27 is an elevation of one-half of an engine block according to the invention.

The entire engine can be assembled and interconnected with other modules utilizing a single uniform fastener and tool, discussed below. In the present example a preferred embodiment of the present invention, the engine utilizes a large diameter modular crankshaft, discussed below. In a preferred embodiment of the present invention, the modular engine is assembled utilizing a uniform fastener of constant size and length. The fastener positions 200 present in an engine are illustrated in FIG. 27. The engines are connected in metal to metal contact providing a uniform cumulative assembled tolerance for the final assembled engine. Uniform cumulative assembled tolerance enables an engine manufacturer to interconnect a plurality of engines without experiencing cumulative tolerance errors between the engines. Cumulative tolerance errors may be experienced when a series of engines are interconnected with gaskets whose thickness may vary according to the force applied. The cumulative error experienced when gaskets are used, may become significant when interconnecting a stack of engines such eight two-cylinder engines, which could be interconnected to form a sixteen cylinder (V-16) engine. Cumulative tolerance errors may cause the engines to align improperly with the crankshaft, due to a variation in the longitudinal axis of the crankshaft. The metal to metal contacts of the present invention enable the eight engine stack for example, a V-16 to be uniform along the longitudinal axis of the crankshaft, without variations caused by the cumulative tolerance errors which may be caused by assembling with gaskets.

In the present example of a preferred embodiment of the present invention, the engine utilizes the entire facial cross section of an engine to form a metal to metal contact, and O-ring form a seal between the entire facial cross sections of adjacent engines. Unlike the Voorhies modular engine discussed earlier, the engine of the present example of a preferred embodiment provides for metal to metal contact between entire cross sections of adjacent engines, enabling the present invention to achieve a more compact design along the longitudinal axis, that is, build a shorter engine.

Cam Follower

Figure 7A:
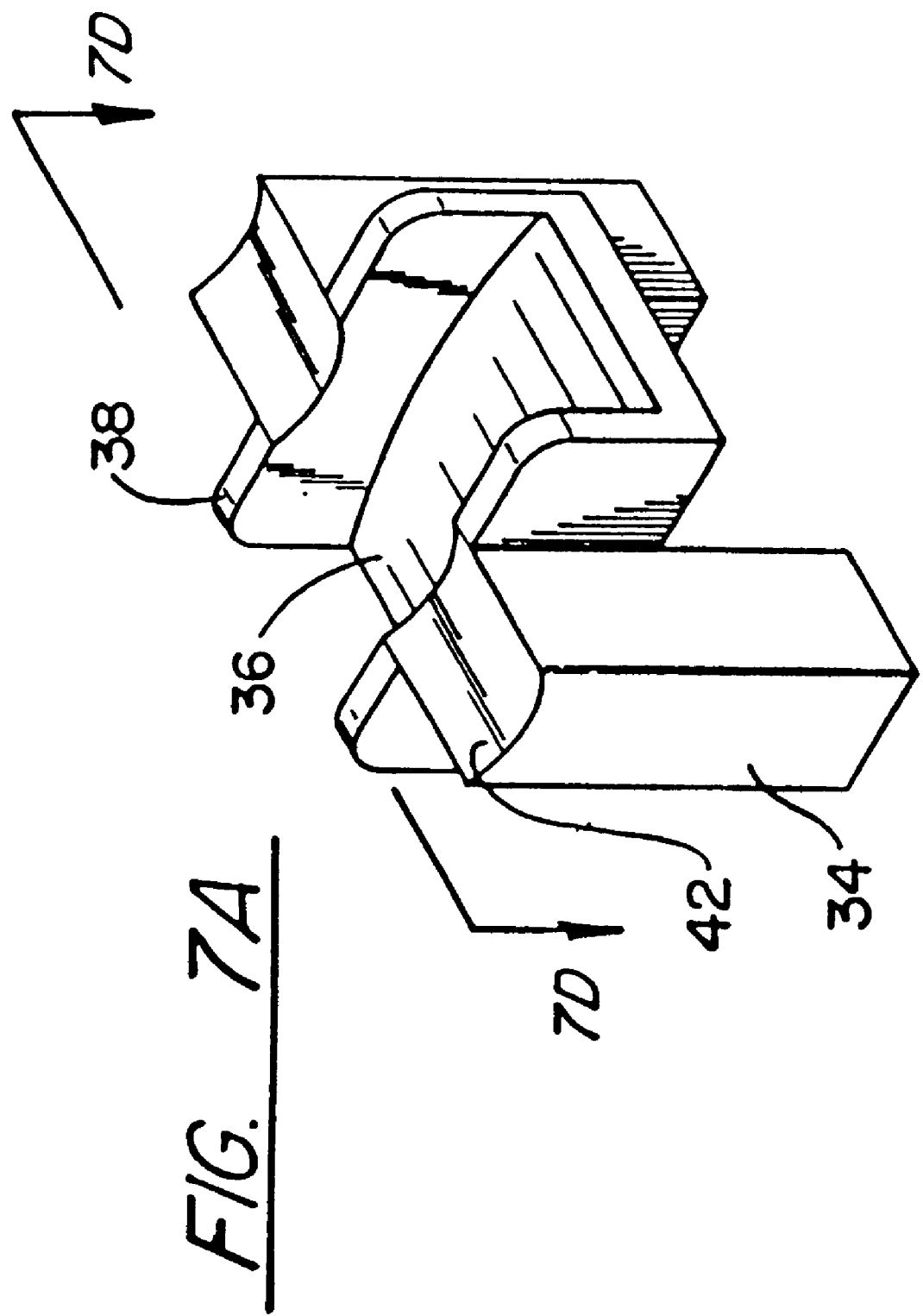
FIG. 7A is a perspective of a cam follower embodying the present invention.

Turning now to FIG. 7, in the present example a preferred embodiment of the present invention a cam follower 32 is utilized to reduce the overall size of the engine and increase its useful life. As shown in FIG. 7B, cam follower mechanism 32 acts as a mechanical intermediary between the rotating cam shaft lobe 40 and the valve stem 54. As shown in FIG. 7C, cam shaft lobe 40 rotates about cam shaft axis 46. As shown in FIG. 7D, the guide rails 34 of cam follower 32 slide up and down in guide slots 37. Guide rails 34 are formed on the sides of the cam follower 32. Guide slots 37 are formed in the cylinder head 35 and a cylinder filler block 33, which is installed or formed in the cylinder head.

As shown in FIG. 7E, the thrust from the rotating cam lobe 40 may be resolved into a horizonal component 39 (side thrust) and a vertical component 41 (down thrust). The cam follower guide rails 34 absorb the side thrust component 39. Thus, only the down thrust cam lobe thrust component 41 is transmitted through the cam follower mechanism 32 to the valve stem 54. Reduction of side thrust reduces wear on a valve stem, for example, valve stem 54 and any associated valve guide.

Guide rails 34 are utilized in the present example of a preferred embodiment to absorb the side thrust component 39 and to provide stabilization of the cam follower 32 along the axis of translation. The cam follower slides up and down on an axis parallel to the longitudinal axis of the cam follower guide rails 34.

The cam follower reduces wear on the valve stem by attenuating the side thrust component 39 of the cam lobe thrust. Thus, only vertical thrust, parallel to the longitudinal axis of the valve stem, is asserted on the valve stem reducing wear thereon. Side thrust increases wear on the valve stem and thus reduces engine life. The cam follower mechanism 32 of the present invention operates in an oil lubricated environment within the cylinder head.

Figure 8:
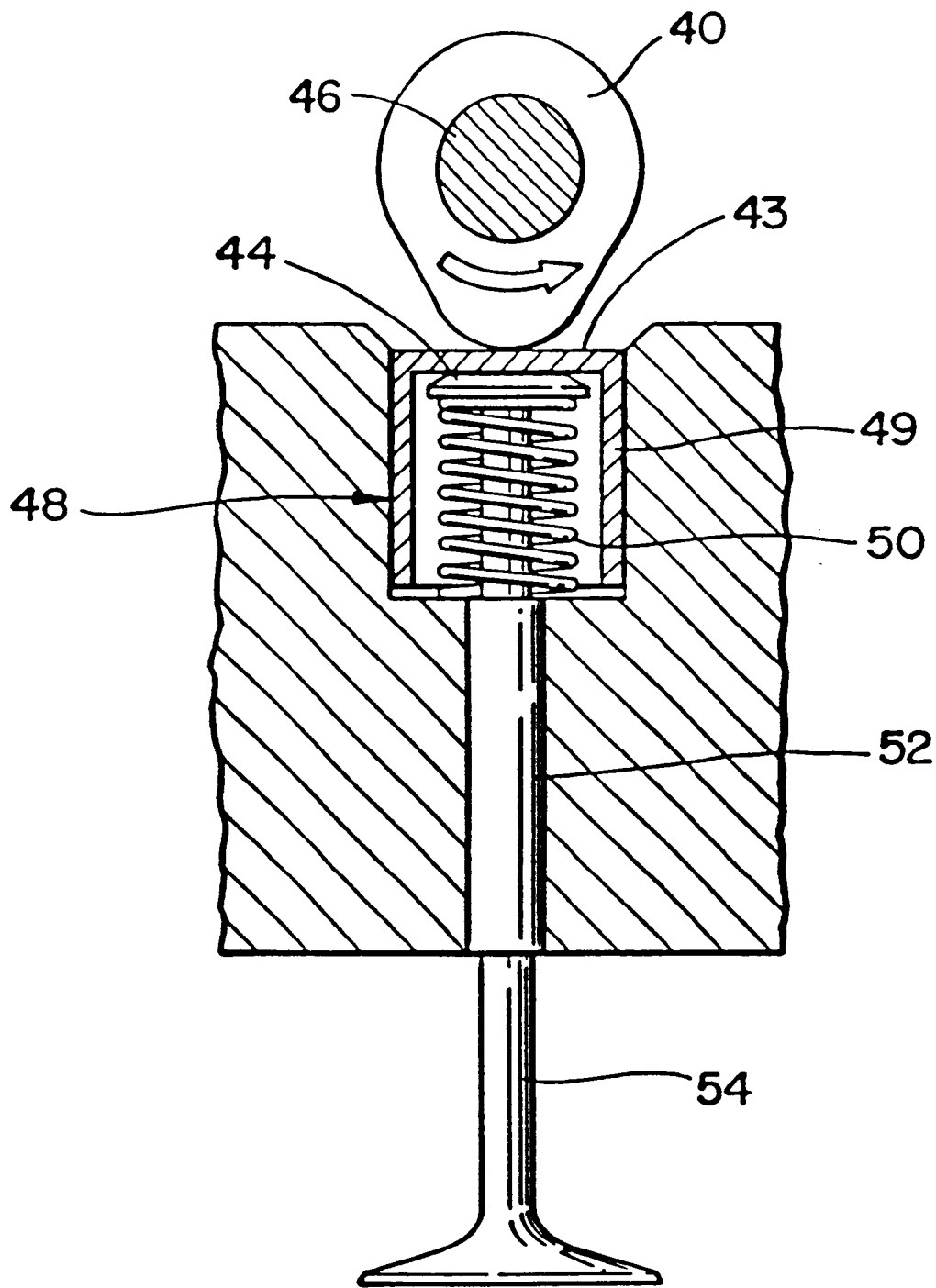
FIG. 8 is a cross-section of a prior art cup-type cam follower assembly.

Unlike typical cup-type cam follower mechanisms, as shown in FIG. 8, the present invention relies on the aspect ratio of the cam follower guide rail 34 rather than the aspect ratio of the diameter of the conventional cup-type cam follower 48. The cup-type cam follower 48 relies on its cup-shape for stability. The cup acts as a mechanical intermediary between the cam lobe 40 and a valve spring 50. Cam lobe 40 rotates about cam shaft axis 46. Cam lobe 40 depresses cup-type cam follower 48, which in turn depresses valve stem 54. Valve stem 54 is depressed along the longitudinal axis of the valve stem 54, and guided by valve guide 52. The conventional cup-type cam follower 48 relies on the aspect ratio defined by the diameter of the cup over the length of the cup, to achieve stability of the cam follower along the longitudinal axis of translation of the valve stem 54. The diameter 43 of the cup-type cam follower 48 must be large enough so that it will fit over the valve spring 50, or some other valve return mechanism. Therefore, the minimum diameter 43 of a cup-type cam follower must be slightly larger than the diameter of the valve spring 50. Thus, the diameter of the valve spring dictates the minimum length of side 49 of the cup required to stabilize the cup. The large minimum diameter cup dictates a long minimum cup length, which increases the size of the engine. Typical engine designs utilize long valve stems to increase the aspect ratio of the valve stem and reduce engine wear. Long stems increase the overall size of the engine. The engine of the present invention provides compact short stem valve and valve stem.

Referring back now to FIG. 7A, in the present example of a preferred embodiment of the present invention, the engine provides cam follower 32. Cam follower 32 relies on the aspect ratio of the guide rail 34 to absorb the side thrust and to achieve stability along the longitudinal axis of the valve stem. Cam follower 32 of the present invention does not have to fit over the valve spring as does the typical cup-type cam follower. This enables the cam follower of the present invention to provide a compact cam follower which reduces the required size of the cam follower and thus reduces the overall size of the engine in which it is embodied.

Cam follower 32 of the present invention relies on the aspect ratio of cam follower rail 34 (the ratio of the length divided by the width of cam follower rail 34) for stability. Cam follower guide rail width is significantly less than that required in a cup-type cam follower, which must fit over the valve spring. The cam follower guide rail of the present invention does not have to fit over the valve spring and therefore is much smaller. Because the width of the cam follower guide rail 34 is significantly less than the required diameter of the cup-type cam follower, the cam follower of the present invention enables construction of a structure which provides high aspect ratio for the cam follower guide rail, yet utilizes significantly less space for any given aspect ratio.

Figure 9:
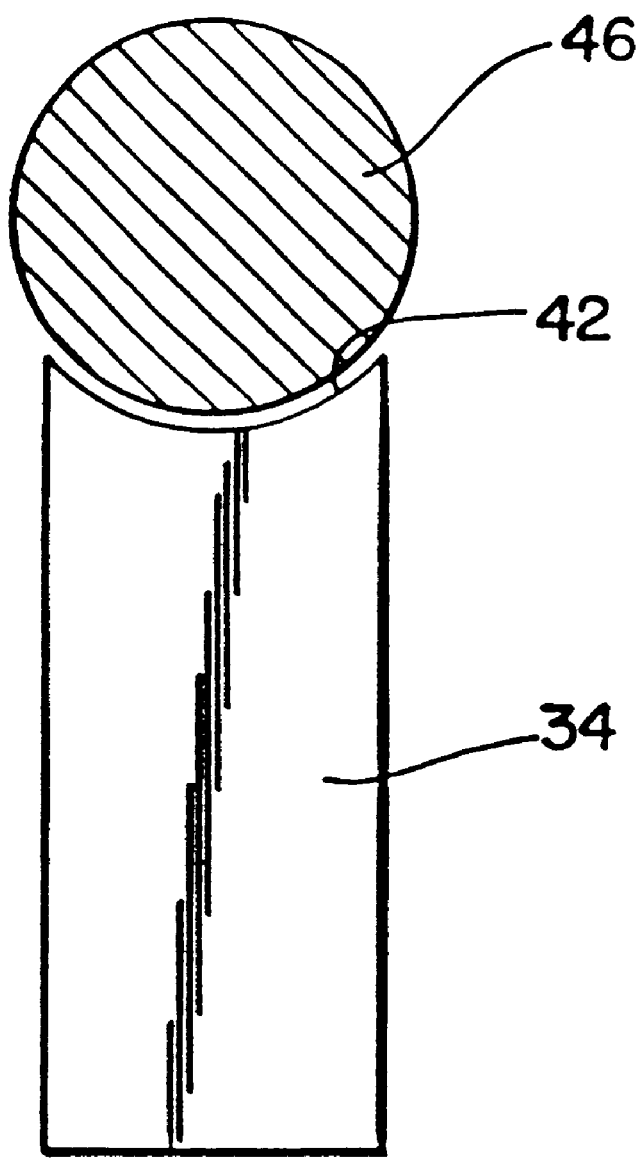
FIG. 9 is a plan view of a cam follower guide rail.

To maximize the guide rail aspect ratio, and the stability of the guide rail 34 the end 42 of the guild rail 34, which engages the cam shaft 43, as shown in FIG. 7B, is cut out to match the diameter of the cam shaft 43, which it engages. This maximizes the length of the guide rail face 35 adjacent guide rail slot 37. The longer rail length absorbs more side thrust and provides more stability to the cam follower along the cam follower's axis of translation. Thus, the cam follower is small but effectively attenuates the side thrust of the cam lobe. FIG. 9 is a detailed illustration of the cam follower guide rail 34, interface 42, and the cam shaft 43.

In the present example, the modular engine of the present invention runs at approximately 2700 RPM. The cam shaft RPM is approximately 1350. The lower RPM and compact design cam shaft reduces the accelerative forces asserted on the cam shaft, the cam follower and the valve assembly. Thus, the cam shaft can be easily constructed by pressing cam lobes onto the cam shaft to obtain an elastic fit, rather than using typical slower manufacturing methods which utilize a plastic fit. The reduced accelerative forces enable the engine to provide a compact and low pressure valve/valve spring apparatus. Thus, the engine provides a smaller diameter valve face, and a shorter length valve stem than typical valves. This compact design valve substantially reduces the dynamic mass of the valve of the present invention over that of typical valve assemblies.

Typical valves are long in order to enhance the stability along its axis of translation. The cam follower of the present invention efficiently absorbs the side thrust component of the cam lobe thrust so that less longitudinal stability compensation is required by the valve stem. Thus, the valve stems do not have to be as long because they do not have to compensate for instability, as are required by the typical valve stems. Thus the present invention valve reduces the required overall size of the engine.

Figure 10A:
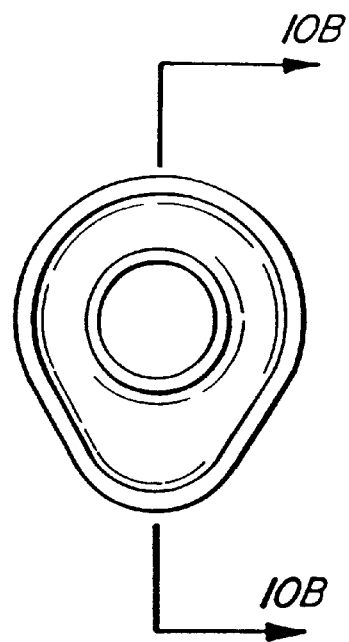
FIG. 10A is a plan view of a modular cam shaft embodying the invention.
Figure 10B:
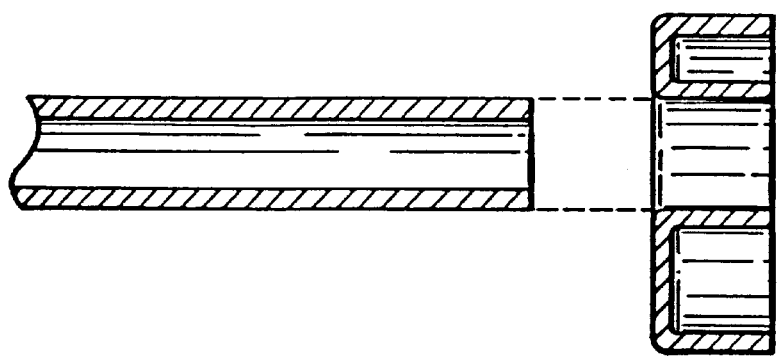
FIG. 10B is a section along line 10B—10B in FIG. 10A.

In the present example of a preferred embodiment, the engine utilizes six valves per engine. Utilizing six valves and a low RPM creates a very light valve requirement and with low inertia. Cam lobes can thus be stamped from sheet metal or made as powered metal pressings and pressed onto the cam shafts as shown in FIGS. 10A and 10B.

Quill Shaft

Figure 11:
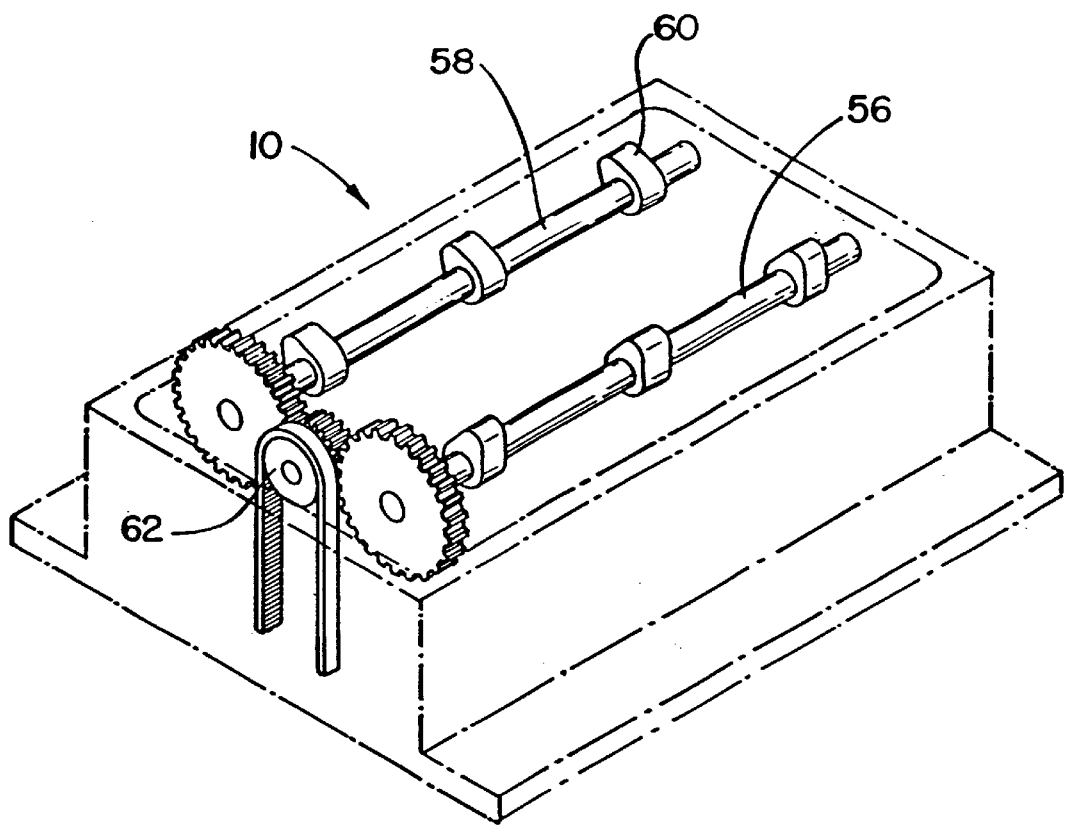
FIG. 11 is a perspective view of dual cam shafts on a simplified engine head.
Figure 12:
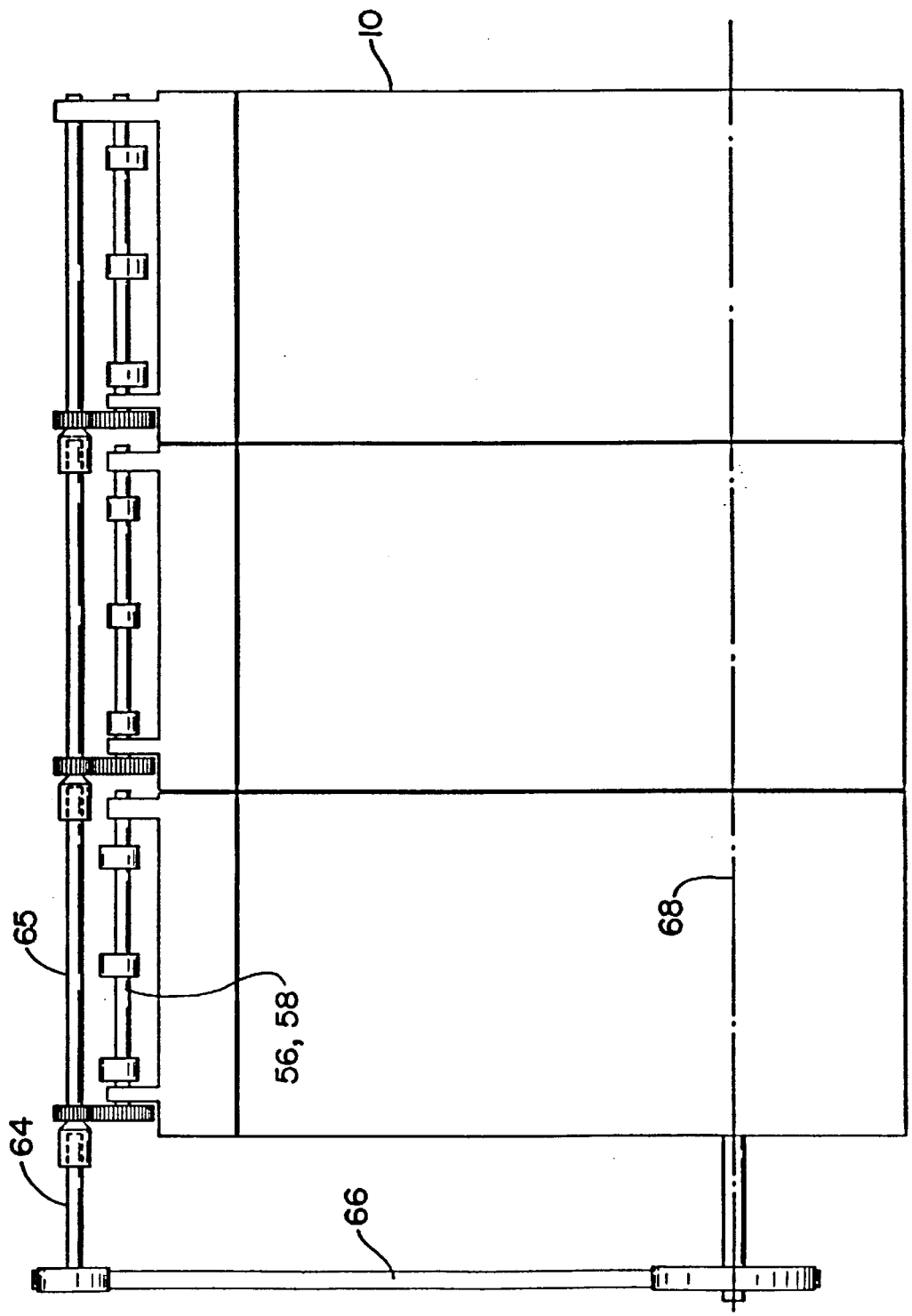
FIG. 12 is a plan view of several cam shafts connected together using a quill shaft.

Turning now to FIG. 11, in the present example of a preferred embodiment, each engine 10 provides two cam shafts 56 and 58. Each cam shaft provides three lobes 60. The rotation of cam shafts 56 and 58 is synchronized by gear 62. FIG. 12 illustrates a series of interconnected engines 10. The timing of the cam shafts 56, 58 for each module is synchronized to the timing of the cam shafts in other interconnected modules.

As shown in FIG. 12, in the present example of a preferred embodiment, the present invention utilizes a quill shaft 64 to synchronize the plurality of cam shafts 56 and 58 provided by each interconnected engine. The quill shaft is driven by step-up drive 66, which is attached to and driven by the crankshaft 68. The step-up drive 66 enables the quill shaft 64 to run at substantially higher RPM than the crankshaft.

In the present example of the preferred embodiment of the present invention, the quill shaft RPM is twelve times that of the crankshaft. Quill shaft 64 comprises a plurality of interconnected sections 65. Each individual quill shaft section 65 is coupled to an individual engine cam shaft. The high RPM quill shaft reduces the torque for a given applied force exerted on the quill shaft. The torque exerted on the quill shaft is reduced by a factor of twelve or the ratio of the quill shaft RPM divided by the crankshaft RPM. The reduced torque induces less torsional deflection or twisting for a given horse power input, than it would at a lower RPM and the same applied horse power. Thus timing errors being induced by torsional deflections are significantly reduced or eliminated by the reduced torque, high RPM quill shaft.

The quill shaft 64 of the present invention enables selection of a variable quill shaft size to accommodate a specified tolerable torsional deflection, or timing error, for an engine comprised of a given number of interconnected engines. Each individual engine is identical, thus each engine provides the same valves, crankshafts, cam shafts and cam lobes. The external quill shaft enables the engine designer to use identical engines to build up larger engines, and maintain independent control over timing errors between the engines by introducing a quill shaft to synchronize the timing between the engines.

Piston

The piston of the present invention enables the manufacture to assemble a engine which is smaller than a typical engine having the same stroke. Because the connecting rod is attached near the piston face at the lower surface of the piston crown, the engine cylinder length need accommodate only the stroke or axial displacement of the piston, without providing the additional length necessary to accommodate the trunk of a typical piston. The preferred embodiment of the piston assembly provides a smaller connecting pin than a typical piston. The engine enables a smaller pin to be utilized by reducing stress forces on it. The smaller pin reduces the dynamic weight of the piston assembly and, the associated accelerative forces asserted on it, thus reduces the connecting rod, and the crankshaft to which it attaches.

Placement of the connecting rod abutting the lower surface of the piston crown enables the connecting rod to be attached close to the upper face of the piston crown, thereby shortening the distance between the connecting rod end and the piston crown. In the typical engine design, the distance between the piston face and the connecting rod end is increased by the length of the piston trunk. Thus, the piston of the present invention does not require as much space to accommodate the same engine stroke because the present invention does not have to accommodate the additional length of the piston cylinder trunk.

The piston crown of the present invention seals the combustion chamber utilizing a piston ring. The piston crown does not rub against the cylinder walls. The piston crown utilizes thrust pads to slide along the cylinder wall guiding the center of the piston. The piston crown can be made of a material which expands and contracts readily under the varying temperatures experienced during engine operation. When the engine first starts, it is cold and the gap between the cylinder wall and the piston is relatively large. The piston crown contracts and expands. The crown is made of thermal conductive material which disburses heat without concerning the engine designer with the clearance between the piston crown edge and the cylinder wall.

Figure 13A:
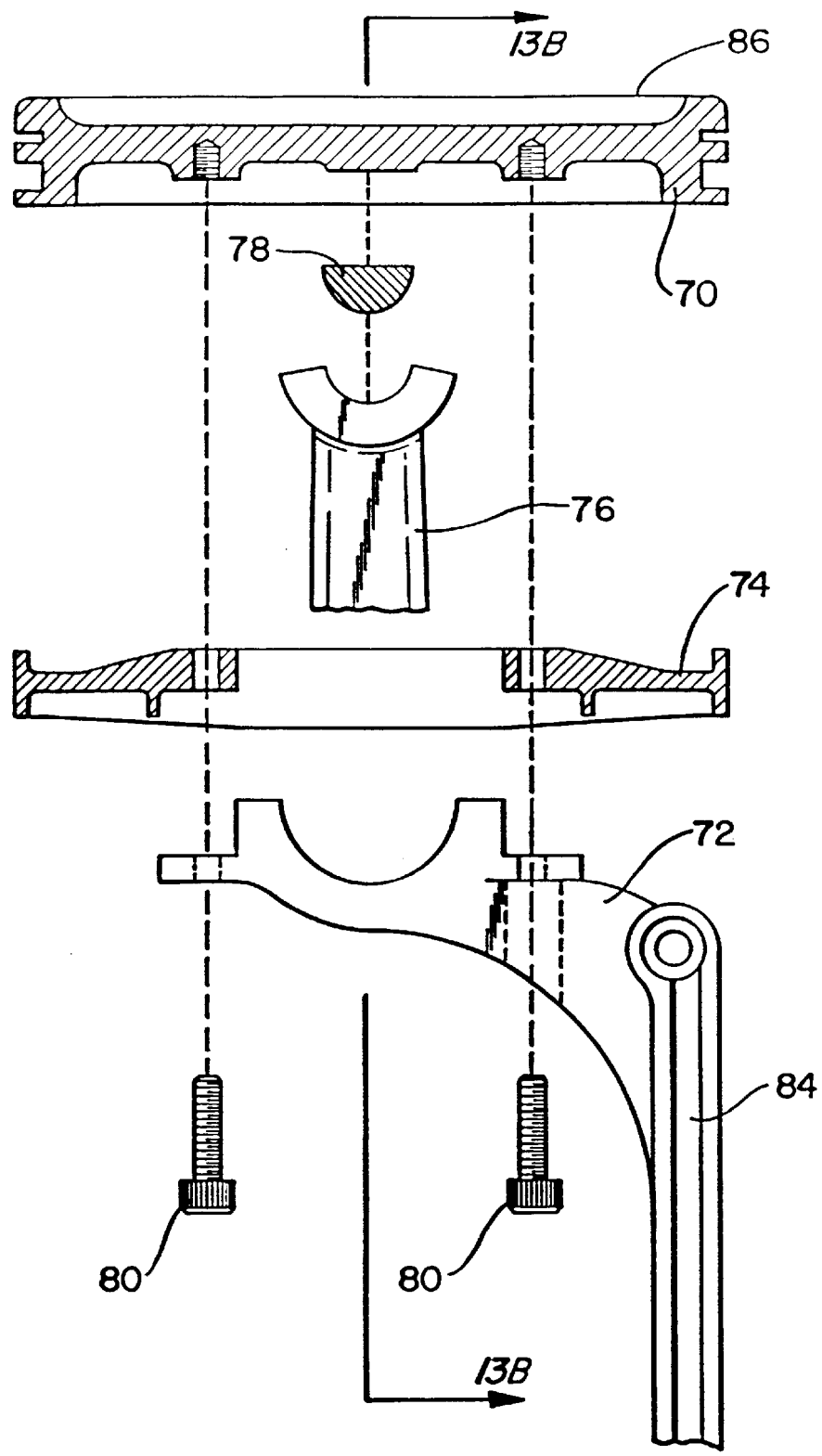
FIG. 13A is an exploded view of a piston that embodies the invention.

Turning now to FIG. 13A, the stability of the piston crown face as perpendicular to the longitudinal axis of the cylinder is provided by the cross head rail guide assembly, rather than the typical piston trunk. The present invention provides guide rails 84 and keys 82 to stabilize the piston crown face perpendicular to the longitudinal axis of the cylinder as shown in FIGS. 13A, 13B, 13C and 13D.

The stability of the piston face is dependant upon the aspect ratio of the stabilizing member. Typically, the piston trunk must be long enough relative to the diameter of the piston face to obtain a suitable aspect ratio and associated stability of the piston face with respect to the longitudinal axis of the cylinder. The present invention utilizes a cross head guide rail assembly to provide stability to the piston crown face in a plane perpendicular to the longitudinal axis of the cylinders. Thus, it is the dimensions of the small rail guide rather than the larger piston diameter which dictate the aspect ratio and stability of the piston crown in the present invention. The present invention provides greater stability utilizing a smaller space, because the stability of the piston crown in the present invention depends on the dimensions of the guide rails 84 rather than the dimensions of the piston.

The stability of a typical piston varies over the operating range of the engine, because the clearance between the stabilizing member, the piston trunk, and the cylinder wall, varies as the piston expands and contracts under temperature variations. The typical engine designer must allow sufficient space between the piston trunk and the cylinder wall to accommodate the expanded piston when hot and swollen. At cooler temperatures, the cooler piston has a smaller diameter. There is a larger gap between the cylinder wall and the piston trunk. Thus, there is less stability of the piston at lower temperatures when the piston cools than when it is hot. The stability of the typical piston varies over the operating temperature, as the gap between the piston trunk and the cylinder wall varies, when the piston expands and contracts.

The rail guide assembly of the present invention maintains a much more consistent stability over varying temperatures. The rail guide is less sensitive to temperature variations. The rail guide relies on the smaller dimensions of the guide rail and associated guide key to maintain tolerances over a wide thermal and stable temperature of the piston. The width of the guide rail, utilized in the present invention, is substantially smaller than the width of a trunk type piston. The guide rail assembly of the present invention is less affected by temperature ranges because there is less metal to expand.

In a preferred embodiment of the present invention, the guide rail is one twenty-forth (1/24th) as wide as a trunk type piston. Thus, the guide rail will expand twenty-four (24) times less than a trunk type piston having a diameter twenty-four times as wide as the guide rail and made of the same material, operating at the same temperature. Thus, an excess gap between the stabilizing member (the guide key) and the guide rail in which it resides could be twenty-four (24) times smaller than the gap between the conventional stabilizing member (the piston trunk) and the guiding cylinder wall in which it resides. This factor of twenty-four (24) gap tolerance clearance advantage manifests itself in the tolerance of the manufacturing process. The engine, of the present invention can be manufactured using reduced tolerance machining to enable manufacture of the engine to proceed quickly and without excess tolerance or induce wear caused by a loose fitting piston rattling in a typical engine. The piston of the present invention maintains a more consistent stability and decreases engine wear while enabling an overall smaller engine to be assembled.

Figure 13B:
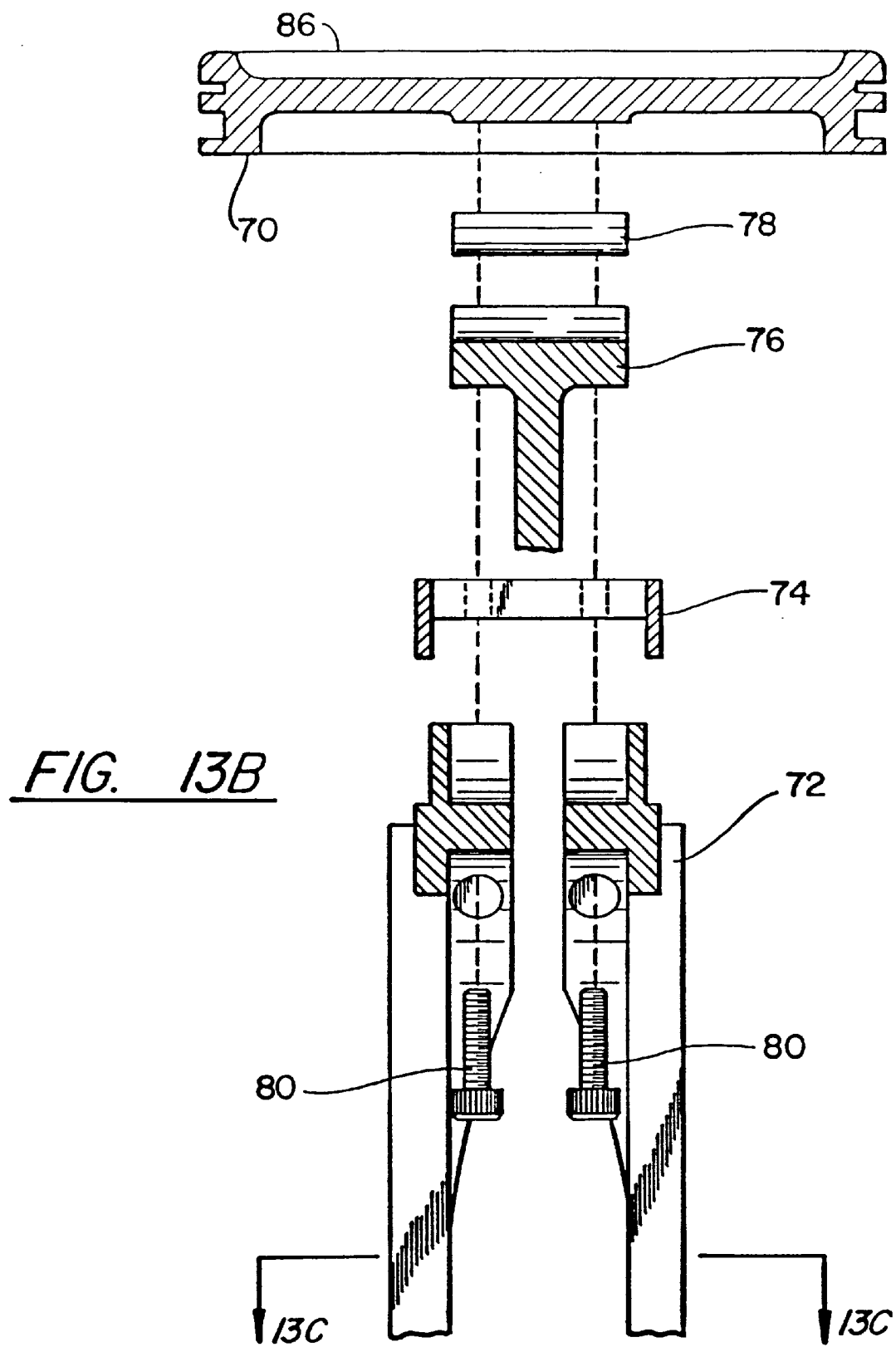
FIG. 13B is a section along line 13B—13B in FIG. 13A.

Turning now to FIG. 13A, the engine provides a piston crown 70 and cross head guide rail assembly 72. Piston thrust pads 74 are provided to center the crown in the cylinder. Connecting rod 76 engages connecting rod pin 78, which abuts the bottom of piston crown 70. Cross head rail guide 72 is attached to piston crown 70 by bolts 80. As shown in FIG. 13B, guide keys 82, are provided in the lower crank case where guide keys 82 engage cross head guide rail slots 72. The cross head guide rail slots 72 and keys 82 stabilize piston crown face 86 and keep it perpendicular to the longitudinal axis of the cylinder parallel to the axis of translation of the piston crown within the cylinder. A plane drawn in the face of the piston crown 86, thus is kept perpendicular to the longitudinal axis of the cylinder. Thrust pads 74 maintain the piston crown 86 centered within the cylinder in which it resides. FIG. 13C is a sectional view of the rail guides 72 and keys 82. The slot guide passes along side the crankshaft enabling a shorter height cylinder and thus a shorter engine to be manufactured using the engine of the present invention.

Figure 14:
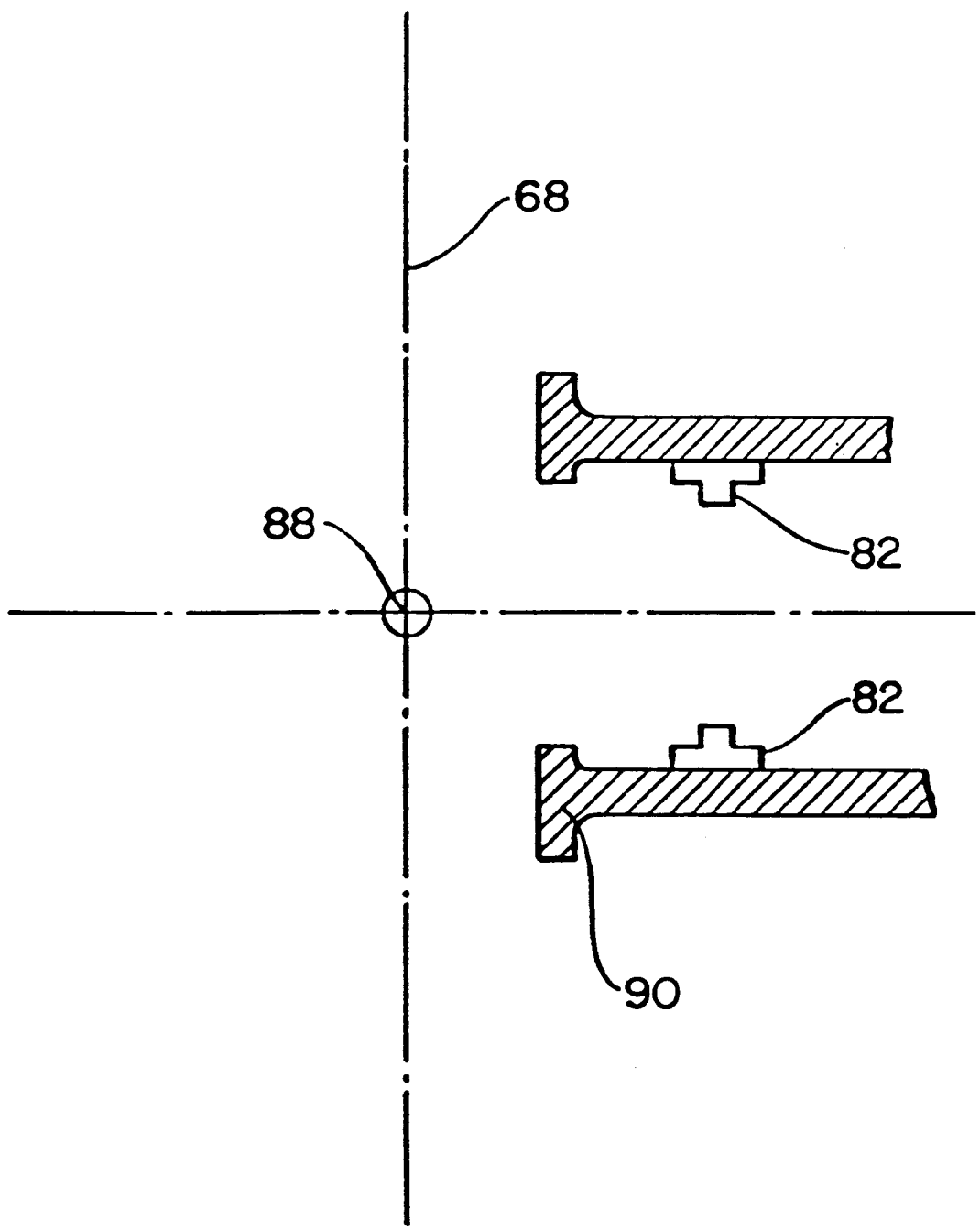
FIG. 14 is a section taken along line 13C—13C in FIG. 13B.

FIG. 14 shows the cross head guide rail assembly for the piston. The guide slot 72 of the cross head guide assembly engages the key 82. As shown in FIG. 14, the guide rail keys 82 protrude along the crank case wall along the longitudinal axis of the crankshaft 68. The center line 88 of the cylinder is shown for reference.

Figure 15A:
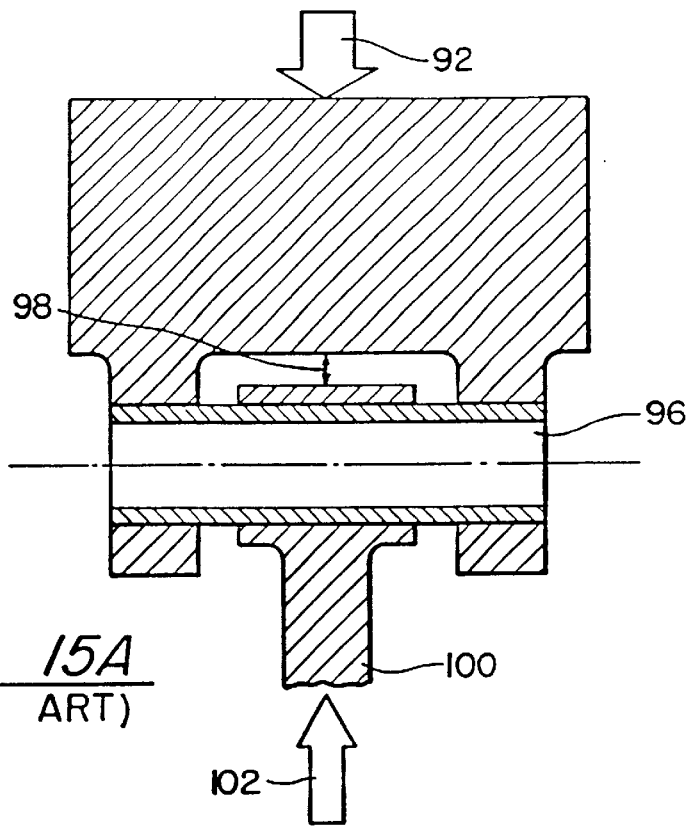
FIG. 15A is a plan view of a crank pin in a conventional prior art engine.
Figure 15B:
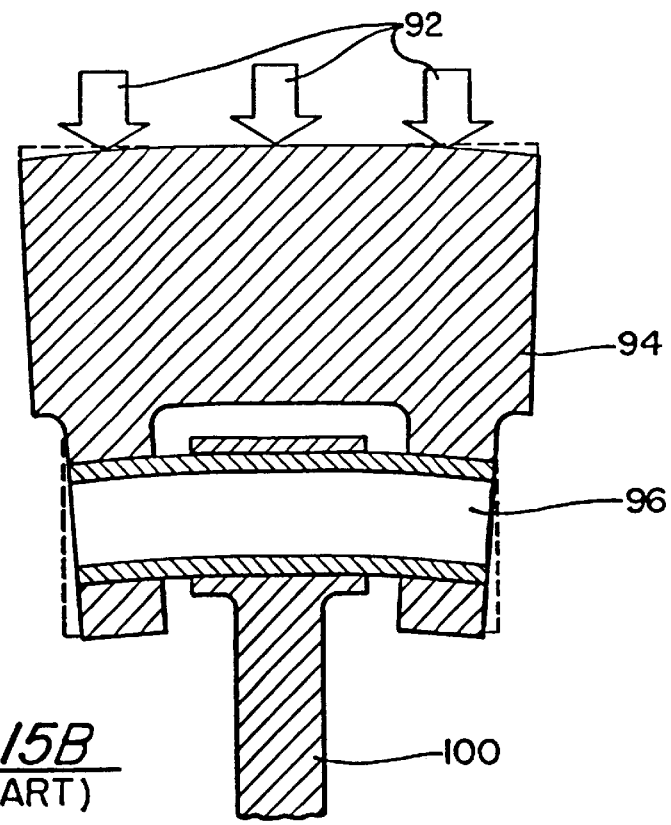
FIG. 15B is a plan view of a crank pin in a conventional prior art engine.

The piston utilized in the present example of a preferred embodiment provides several advantages over typical trunk type pistons. As shown in FIGS. 15A and 15B the typical connecting rod pin 96 is located a distance 98 below the bottom of the piston 94. Typical connecting rods 100 are attached to connecting pin 96. In the typical trunk type piston, as shown in FIG. 15A, the force of combustion 92 presses down on the top of conventional trunk type piston 94. As shown in FIG. 15B, the combustive force 92 pressing down on conventional piston top 94 places a force and induces an associated bending moment on connecting pin 96. This bending moment tends to stress connecting pin 96, trying to bend connecting pin 96 around the longitudinal axis 102 of connecting rod 100. This bending moment tends to place undue wear on the connecting pin and shortens engine life. There is no bending induced on the connecting pin of the piston assembly provided by the present invention.

Figure 16A:
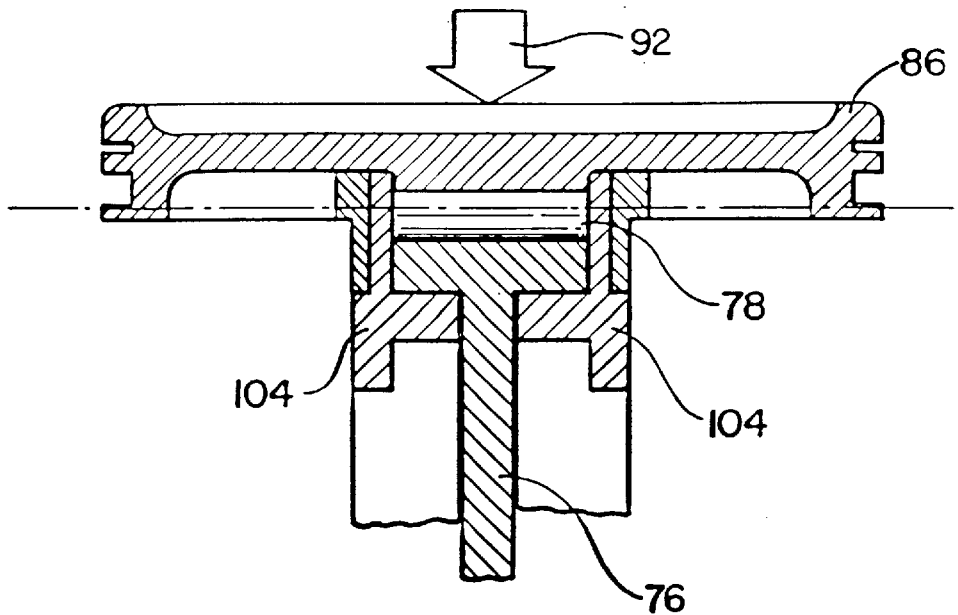
FIGS. 16A and 16B are enlarged plan views, 90° apart, of the piston shown in FIG. 13A.
Figure 16B:
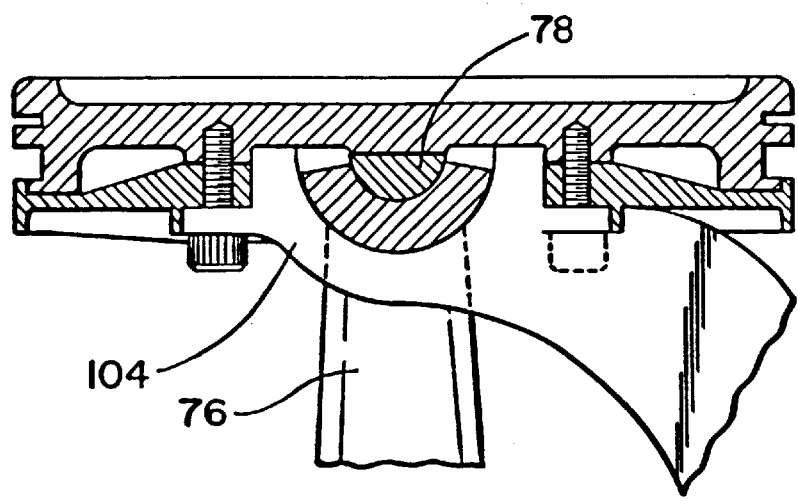

Turning now to FIG. 16A, in the piston of the present invention, force 92 acts on the top of the piston crown 86. In the present invention connecting pin 78 adjoins both the lower surface of the piston crown 86 and the top of connecting rod 76. Thus, there is no bending moment applied to the connecting pin 78, as it mechanically engages both the bottom of the piston crown 86 and connecting rod 76. The connecting rod 76 and connecting rod pin 78 are attached to piston crown 86 by retaining rings 104. FIG. 16B is a view of the piston crown connected to the connecting rod and connecting pin turned ninety degrees (90°) from the view shown in FIG. 16A.

Connecting Rod

Figure 17:
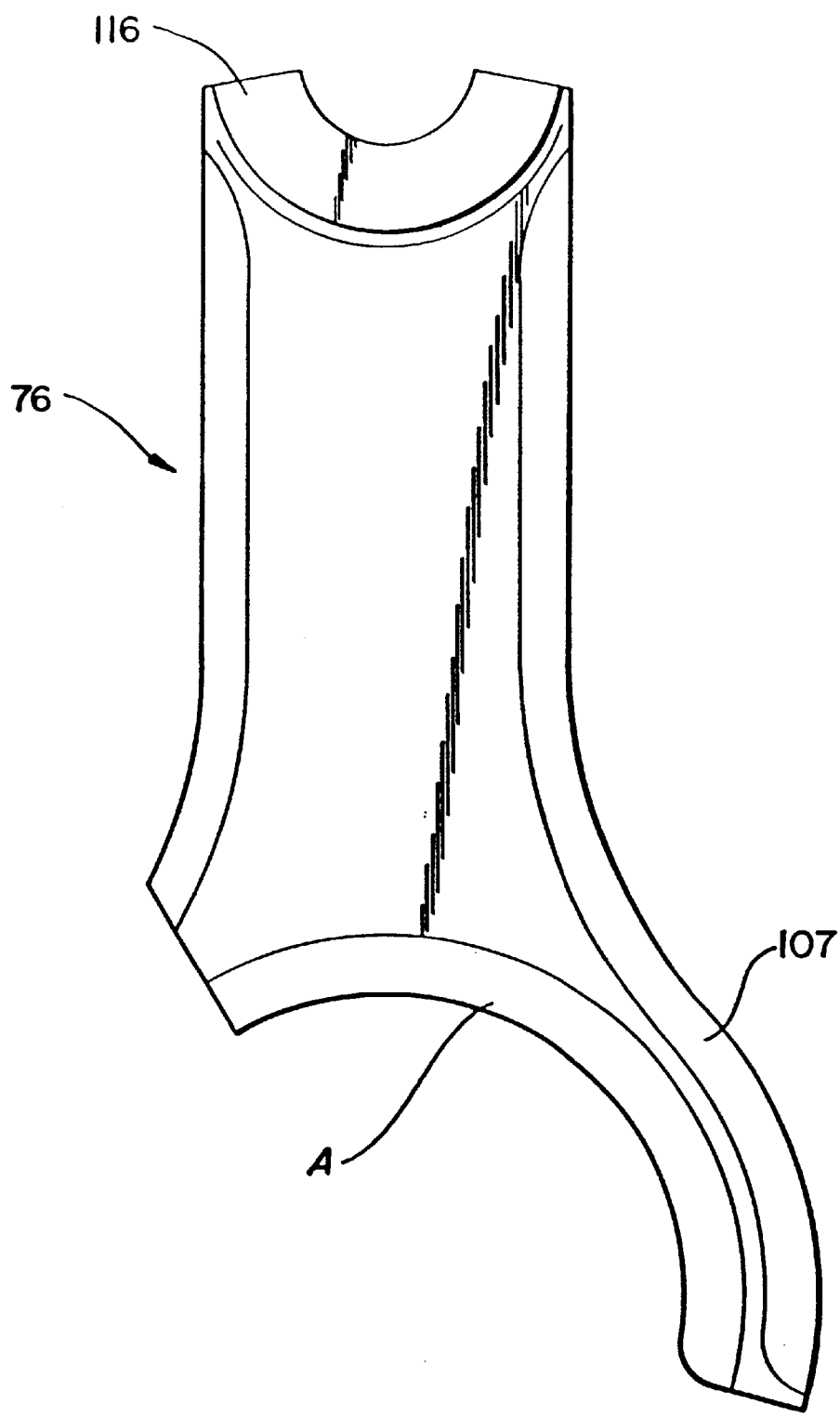
FIG. 17 is a plan view of a connecting rod assembly embodying the invention.

Turning now to FIG. 17, in the present example of a preferred embodiment of the present invention, the engine provides a connecting rod 76. The smaller end 116 of connecting rod 76 attaches to the bottom surface of the piston crown as shown in FIG. 13A, discussed earlier. The large end of the connecting rod 107, as shown in FIG. 17, connects to the crank pin 108, as shown in FIGS. 18A and 18B.

Figure 19A:
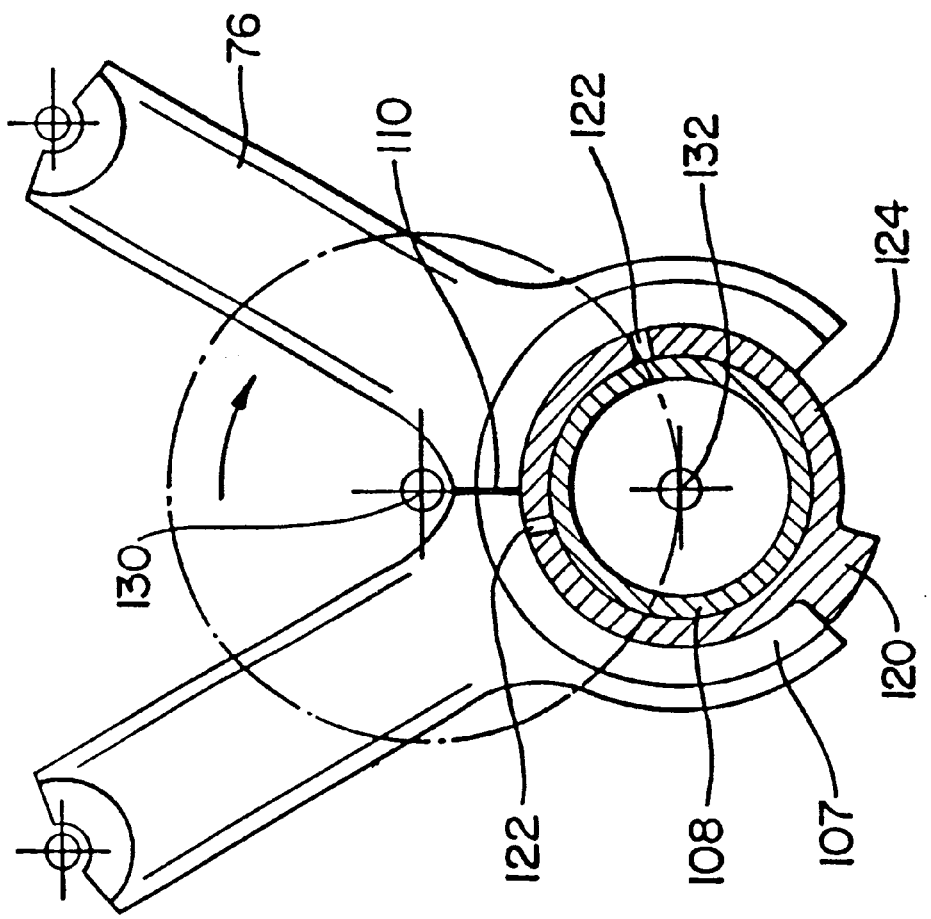
FIGS. 19A and 19B show relative positions of connecting rods and a tabbed bearing at two different times in an engine power cycle having two pistons.
Figure 19B:
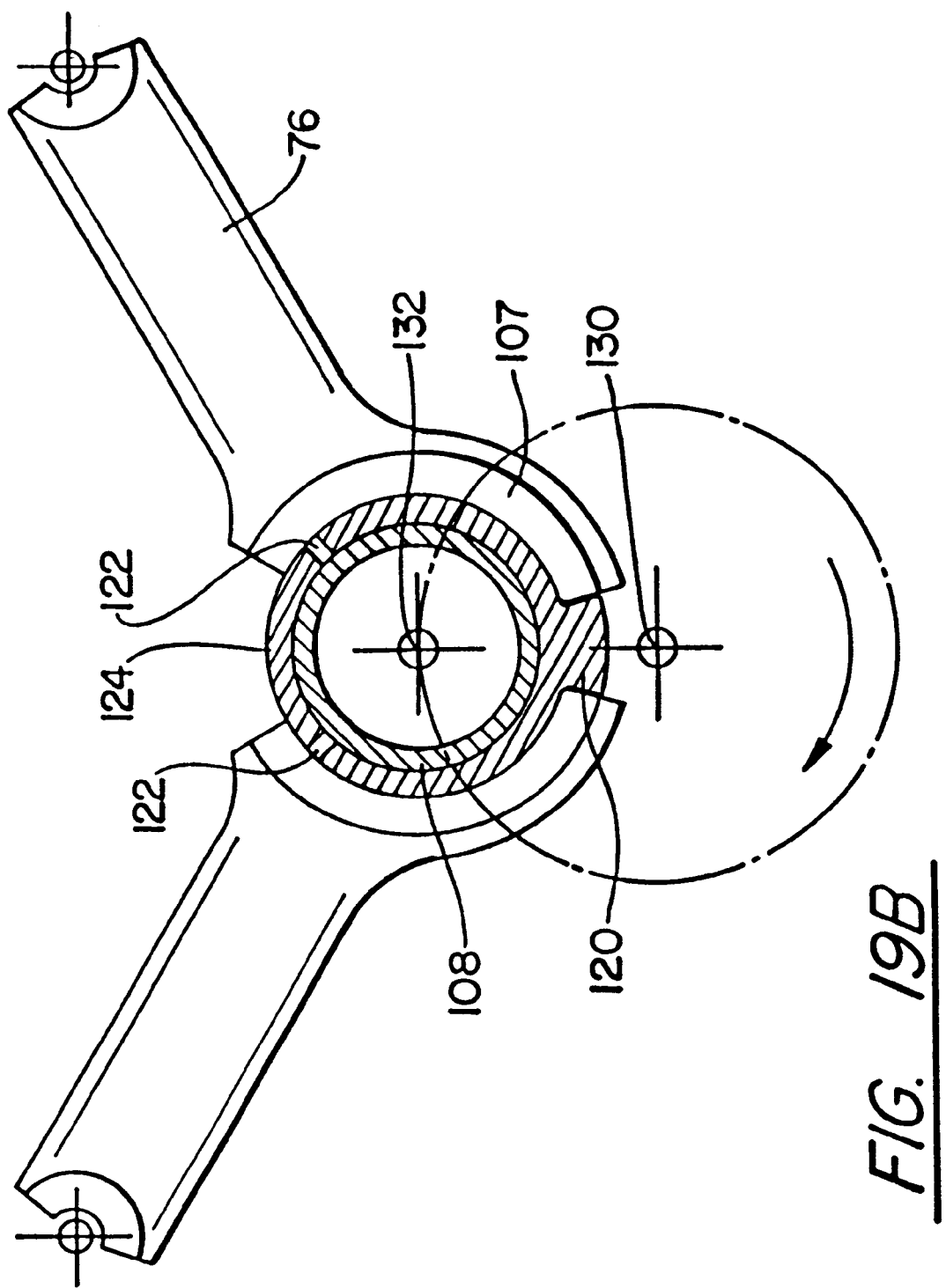

Turning now to FIGS. 19A and 19B in the present example of a preferred embodiment, the large end of the connecting rod forms a 136° semicircular arc which closely approximates the outside diameter of tabbed bearing 124. Tabbed bearing 124 abuts connecting rod end 107 on its outside diameter and the crank pin 108 on its inside diameter. The tabbed bearing 124 provides oil apertures 122 which enable oil to pass to provide lubrication for the connecting rod crank pin assembly.

Figure 18B:
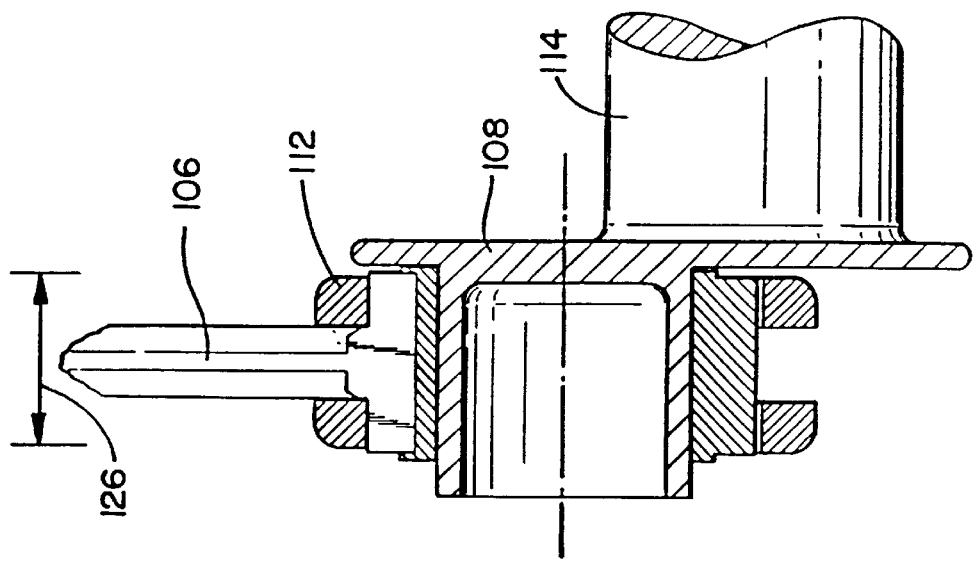
FIG. 18B is a sectional taken along line 18B—18B in FIG. 18A.
Figure 18A:
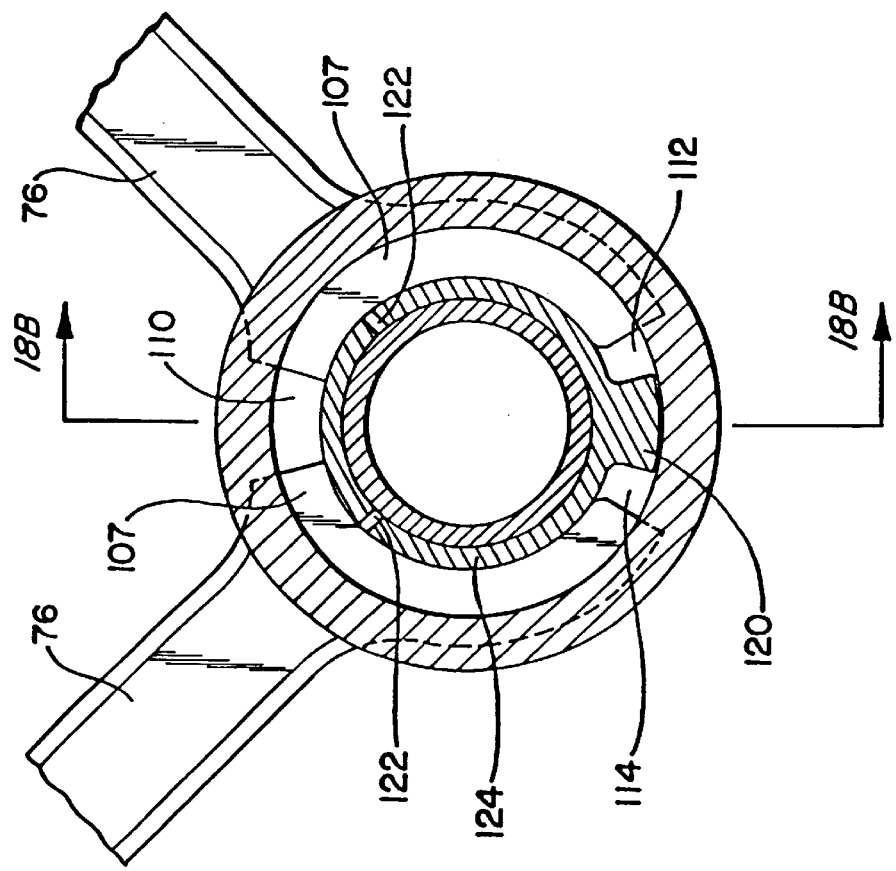
FIG. 18A is a plan view of an assembled connecting rod assembly and crank pin.

As shown in FIG. 18B, the width 126 of connecting rod end 107 is preferably a minimum distance to enable hydrodynamic bearings to be formed between the connecting rod end 107 and the tabbed bearing 124. The tabbed bearing also provides for lubrication between the internal diameter of the tabbed bearing 124 and the crankshaft pin 108.

As shown in FIGS. 19A and 19B in the present example of a preferred embodiment, a plurality of connecting rods 76 are attached to one crankshaft pin 108. Connecting rods 107 preferably do not encircle crankshaft pin 108. Thus each connecting rod end 107 requires less than 180° of crank pin surface. In the present example, they are each at a 136° arc. The connecting rod ends 107 may rotate relative to crankshaft pin 108 without interfering with each other. A set of retaining rings 126 are utilized to rotationally attach connecting rods ends 107 around the tabbed bearing 124 and the crankshaft pin 108. The modular crankshaft pin comprises a male and female member which are inserted through the circular opening in the tabbed bearing 124 after the connecting rods 76 and retaining rings (FIG. 18A) have been assembled to form a circular structure around the connecting rod assembly.

The connecting rod assembly of the present invention enables an engine designer to connect more than one connecting rod to a single crank pin. Multiple connecting rods can be attached to a single pin while utilizing a minimum length crank pin just long enough to accommodate lubricating a connecting rod of minimum width 126, as shown in FIG. 18B. The minimum crank pin length is preferably equal to the minimum width for which a single connecting rod 107 has adequate lubrication. The minimum width crank pin of the connecting rod assembly enables the engine designer to build a shorter crank pin and overall shorter crankshaft. Each crankshaft pin length in the crankshaft is reduced by a factor equal to the number of connecting rod ends attached to an individual crankshaft pin. A shortened crank pin reduces the bending moment asserted on the crank pin. The shorter crankshaft experiences smaller bending moments for a given force than a longer crankshaft.

Turning now to FIG. 20, the crankshaft pin 108 is provided having large diameter crankshaft pins 109 and crankshaft 114 to reduce the torsional deflection induced in the crankshaft by the forces applied by the pistons.

The crankshaft provided is a plurality of modules which plug together. After the connecting rod assembly has been assembled, male and female sections of the crank pin can be inserted and joined inside of the circular end of the connecting rod assembly. The connecting rod ends 107 do not fully encircle the crankshaft pin 108 so that gaps 110, 112 and 114, as shown in FIG. 18A, are formed between the connecting rod ends 107. Tabbed bearing 124 is utilized for lubrication between the crankshaft pin 108 and the connecting rod end 107. Tab 120, on tabbed bearing 124, restricts the rotational motion of the tabbed bearing 124 and oil apertures 122 relative to the connecting rod ends 107. Thus, oil apertures 122, which supply oil to the exterior surface of the tabbed bearing and the interior surfaces of the connecting rod end 107 are prevented from rotating far enough to become exposed to the gaps 110, 112, 114 between the connecting rod ends 107. Thus, oil is prevented from being pumped from the oil apertures 122 and through gaps 110, 112 and 114. Oil pumped through the gap flows to the bottom of the engine and has to be recovered with a scavenging pump. Reduction of the amount of oil escaping through the gaps reduces the amount of oil that has to be pumped back. The scavenging pump can be smaller in the present invention. This reduces the over all engine size. The positioning of the oil apertures 122, so that they stay under the connecting rod ends 107, and do not allow oil to escape through the gaps 110, 112 and 114. This also reduces the amount of oil which must be supplied to the connecting rod assembly by the supply pump. This reduces the size of the oil supply pump required to pump oil to the connecting rods and thereby reduces the overall size of the engine.

In an alternative embodiment of the present invention, a male eyelet and female circular eyelets are formed in the bottom of connecting rods which share a crankshaft pin. The female circular eyelet comprises a forked set of circular eyelets which slide over the male circular eyelet. The combined male and female eyelets form a circular eyelet connecting rod assembly. The assembly is of a width sufficient to enable formation of hydrodynamic bearing between the crank pin and the connecting rod ends that slides over the crankshaft pin.

In the alternative embodiment, a pressed sleeve bearing is press-fitted onto the forked female eyelet so that the pressed bearing sleeve does not rotate relative to the female connecting rod. The crankshaft connecting pin rotates underneath the sleeve bearing of the female rod. The displacement between the male connecting rod end and the sleeve bearing pressed into the female connecting rod end is thus minor. The male rod rotates over the bearing fixed in the female eyelet as the crankshaft rotates in a circle within the bearing fixed in the female eyelet. Two connecting rods drive two pistons by driving a single connection formed by the male and female connecting rod ends.

The path of the connecting rod ends 107 and tabbed bearing 124 utilized in the present example of a preferred embodiment is illustrated in FIGS. 19A and 19B. FIG. 19A shows the connecting rod ends 107 and tabbed bearing 124 when the crankshaft has rotated to bottom of the piston stroke. At this point, the center of the crankshaft is at point 130, as shown in FIG. 19A. In FIG. 19B, the crankshaft has now rotated to the top of the piston stroke and the center of the crankshaft pin is now located at point 132. Point 130 is repeated for reference. Notice that in FIG. 19A, when the pistons are at the bottom of the stroke, the connecting rod ends 107 do not meet but leave a gap 110 between them. In FIG. 19B, when the pistons are at the top of their stroke, the connecting rod ends 107 rotate so that they leave small gaps 114 and 112 (FIG. 18A) between the connecting rod ends 107 and tab 120 of tabbed bearing 124. Oil apertures 122 remain underneath connecting rod ends 107 and are not exposed to gaps 110, 112 or 114 during any point of the rotation of the crankshaft pin.

Modular Crankshaft

Turning now to FIG. 20, in the present example of a preferred embodiment, the engine utilizes a modular crankshaft 114, as shown in FIG. 20. The modular crankshaft 114 utilizes a male 111 female 109 assembly to form a crank pin 108. The male section 111 slides into the female section 109 to form crank pin 108. The male and female sections are splined together for rotational fixation between them. The present invention provides a structure which reduces the bending moment asserted on the crank pin 108 by the connecting rod end 107. This is accomplished by reducing the width 126 (FIG. 18A) of crank pin 108, to the minimum width needed to form a hydrodynamic bearing, based on the width of a single connecting rod end 107, tabbed bearing 124, and crank pin 108. The necessary length of the crank pin is reduced because more than one connecting rod end 107 is attached to the pin 108.

Two connecting rod ends 107 are connected to a single width 126 crank pin 108, reducing the necessary overall length of crank pins by a factor of two, because two connecting rod ends are sharing the same crank pin whose length equals the minimum width 126 of a single crankshaft pin. If three connecting rod ends 107 are connected to a single crank pin 108, the pin length requirement is reduced by a factor of three, and so on.

Figure 21:
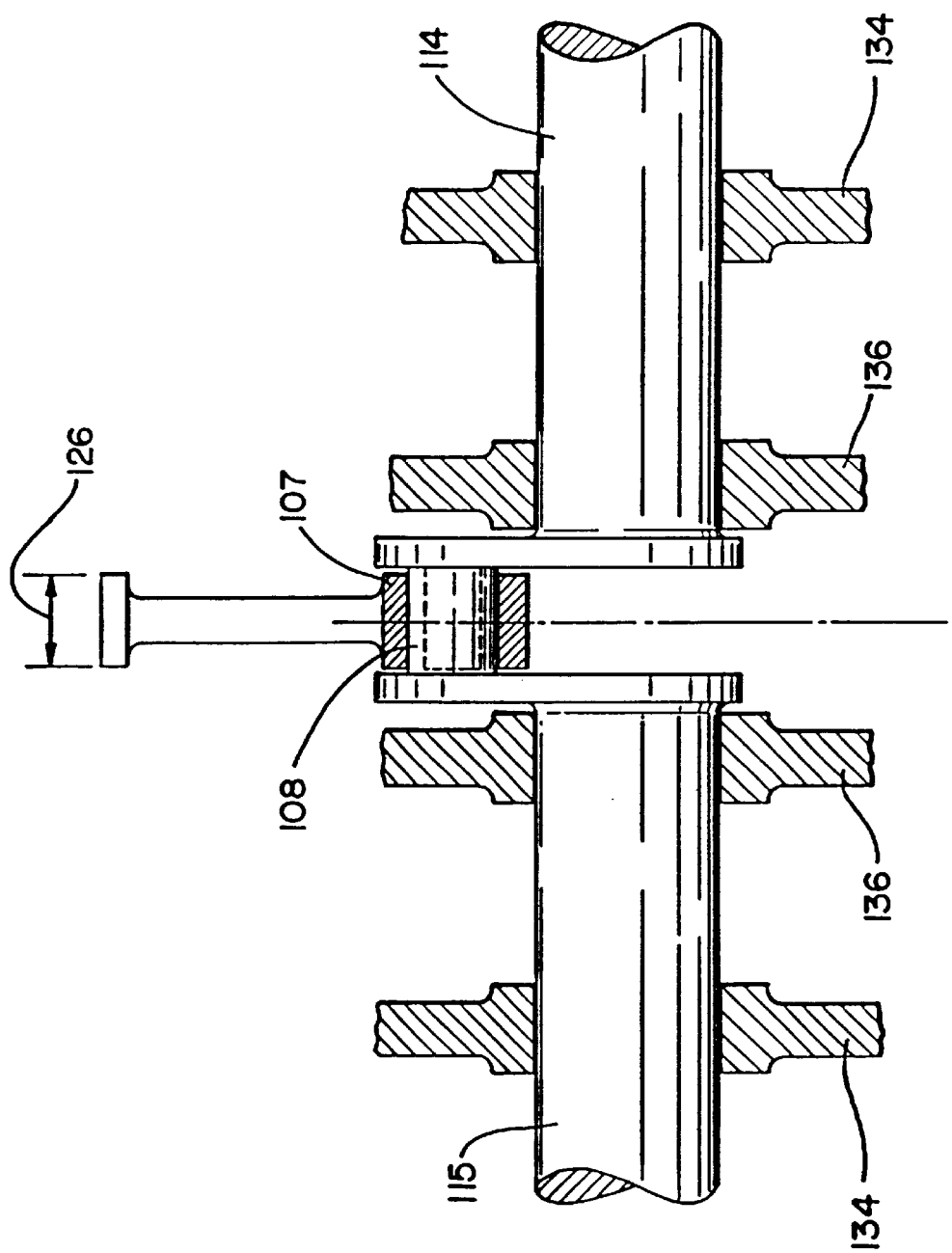
FIG. 21 is a plan view showing a connecting rod on the crankshaft of FIG. 20.

As shown in FIG. 21, reducing the crank pin length reduces the overall crankshaft length and thus reduces the bending moment asserted across the width of a crank pin by connecting rod 107. Reducing the bending moments by minimizing the width utilizing a single width crank pin for multiple connecting rod ends, reduces the length of crank pins and thus reduces the overall length of the crankshaft. The reduced width of the crank pins reduces the bending moment of a force asserted on a crank pin. Thus, the crank pins suffer less deformation twisting, and torsional deflections during operation. Crank pin 108 and crankshaft 114 are formed of large diameter tubing which minimizes the torsional deflection within the crankshaft and crank pins.

The present invention provides sufficient overlap between the male section 111 of the crank pin and the female section 109 of the crank pin. The crankshaft is made of a stiff material and is configured in large diameter so that the natural frequency of vibration of the crankshaft and crank pins is much higher than the frequency of rotational power impulses applied to the crankshaft by the low RPM pistons through the connecting rods. The present example of a preferred embodiment, utilizes a modular engine with a maximum RPM of approximately 2,700. Thus, the frequency of piston impulses applied to the crankshaft is much lower in the low RPM engine than the natural frequency of vibration of the large diameter crankshaft. The frequency of the impulses supplied by the pistons does not match the natural frequency vibration of the crankshaft of the present invention. This mismatch substantially reduces the possibility of harmonic breakage of the crankshaft to lower than that encountered with typical modular crankshafts.

As shown in FIG. 21, crankshaft bearings 134 and 136 support each section 115 of the modular crankshaft. Each section of the modular crankshaft is support by bearings 134 and 136, so that the bending moments and shear forces from the piston are resolved in a redundant manner by each of the crankshaft sections 114 and 115, which connect together to form a crank pin 108, which receives the load from a piston.

Cylinder Head Seal

Figure 22:
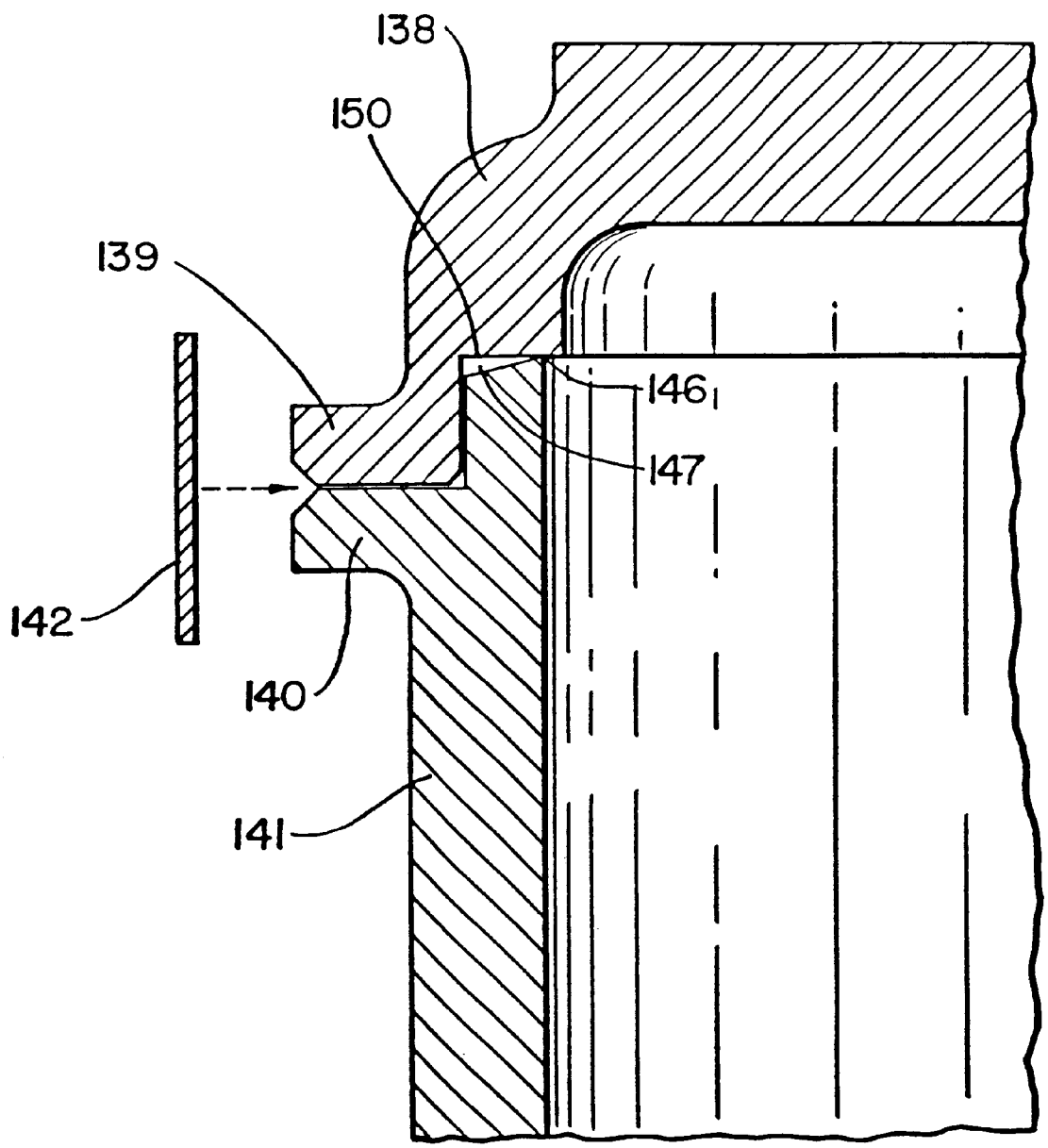
FIG. 22 is a sectional view of a portion of a cylinder head using a seal arrangement according to the invention.

Turning now to FIG. 22, in a preferred embodiment of the present invention, the engine utilizes a metal to metal seal between cylinder head 138 and cylinder 141. Cylinder head 138 is configured separately from cylinder 141. The shell of configuration of the separate cylinder head 138 enables conventional machine bits to traverse the depth of the cylinder head 138. The shallow depth of the cylinder head 138 enables short rigid machine bits to accurately machine the cylinder head surfaces. Longer machine bits, which would be required with a one-piece cylinder head and cylinder would have to traverse the length of the cylinder to reach and machine the cylinder head. Configuration would require long machine bits which would be less rigid and thus less accurate in machining of the cylinder head 138.

The cylinder head of the present invention utilizes a metal to metal seal between chamfered edge 146 of cylinder 141 and a flat surface 150 within the female portion of cylinder head 138 into which the top male portion of the cylinder inserts. The present invention has advantages over cylinders assembled using gaskets to seal the cylinder head. The metal to metal contacts of the present invention forms a seal without the attendant variations in assembled tolerances experienced when utilizing gaskets to assemble an engine.

Figure 23A:
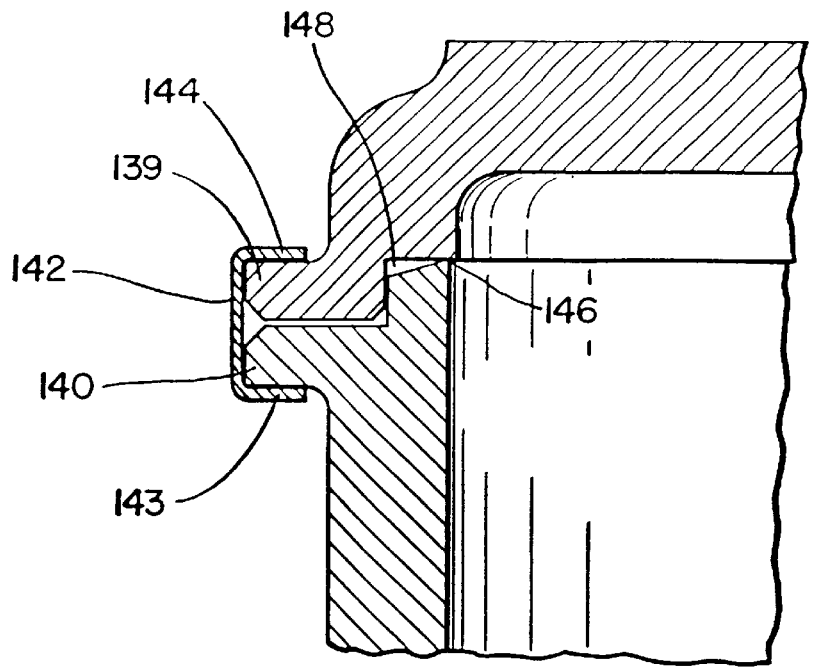
FIGS. 23A and 23B are sectionals of the cylinder head shown in FIG. 22 with a retaining ring in different stages of deformation.

The cylinder head 138 forms a female receptacle into which the wall of cylinder 141 slides and mechanically engages. Chamfered edge 146 of cylinder wall 141 abuts flat surface 150 of the cylinder head 138. Turning now to FIG. 23A, retaining ring 142 is shown as a U-shaped bracket, forming right angles 144 and 143, and fitting over cylinder head land 139 and cylinder wall land 140. Retaining ring ends 143 and 144 abut lands 139 and 140.

Figure 23B:
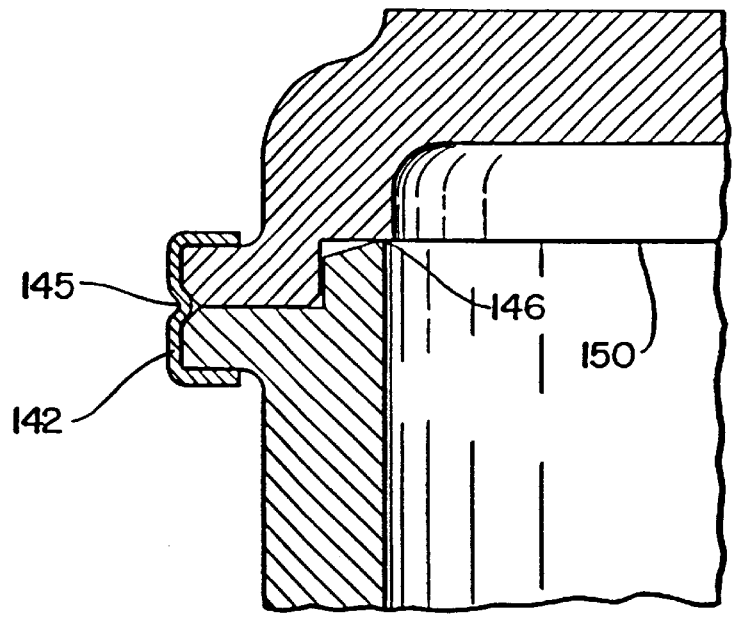

Turning now to FIG. 23B, an indention 144 is then formed in retaining ring 142. This indention 145 shortens the retaining ring 142 so that retaining ends 143 and 144 are drawn closer together. Retaining ring 144 exerts a compressive force on cylinder head land 139 and cylinder wall land 140 bringing the two lands closer together and applying a compressive force on cylinder chamfered edge 146 which opposes the flat surface 150 of the cylinder head. The pressure asserted by the retaining ring on the chamfered edge 146 forms a seal between the chamfered edge 146 and the flat surface of the cylinder head 150. Thus, a metal to metal seal is formed in the combustion chamber between the cylinder edge 146 and cylinder head surface 150. The retaining ring and lands form a flange which fits into a female groove 195 formed in engine half 26 (FIG. 5).

The combustion pressure between the top of the piston crown and the interior surface of the combustion chamber formed by the cylinder wall and the interior of the cylinder head tends to assert a force on the cavity formed between the chamfered edge 146 and flat surface 150. Pressure within this small area is negligible and not threatening to the integrity of the seal between the cylinder and cylinder head. Any combustive force that leaks through the cylinder head seal, if any, exerts a negligible pressure on the gap formed between chamfered edge 146 and flat surface 150.

Lubrication System

In the present example of a preferred embodiment of the present invention, the engine provides an independent lubrication system for each engine Referring to FIG. 4 each engine contains an independent lubrication and cooling system comprising a coolant pump 402, a scavenger pump 404, and a pressure pump 406. When engines are interconnected, the coolant and lubrication fluids are manifolded 408a, 408b and 408c in parallel to each engine so that each engine is supplied with lubricating and coolant fluid at the same temperature. Thus, each engine runs at the same temperature. A plurality of engines connected together to form an extended engine, will have an adequate pumping system because each engine is independently lubricated and cooled. There is no need to add additional pumps to an assembly of interconnected engines other than to manifold the supply to the engines.

The present invention has an advantage over typical engines which supply coolant and lubricant serially to each engine. Typical engine designs provide for serial coolant and lubricate distribution. Coolant and lubricate are first run through a first engine before they are run through the second, third, fourth, fifth engine, etc. In the present example of a preferred embodiment, the coolant and lubricant are provided in parallel to each engine module so that the coolant and lubricant are supplied to each engine at the same temperature, rather than preheating the lubricate and coolant in the first engine before sending it to the second engine and so on. Thus, the present invention runs at a lower overall temperature and a more constant temperature. The inherent adequacy of the independent pumps provided within each engine eliminates the need for an engine manufacturer to install custom pumping systems to promulgate various numbers of engines connected together to form a engine.

Valves

Figure 24:
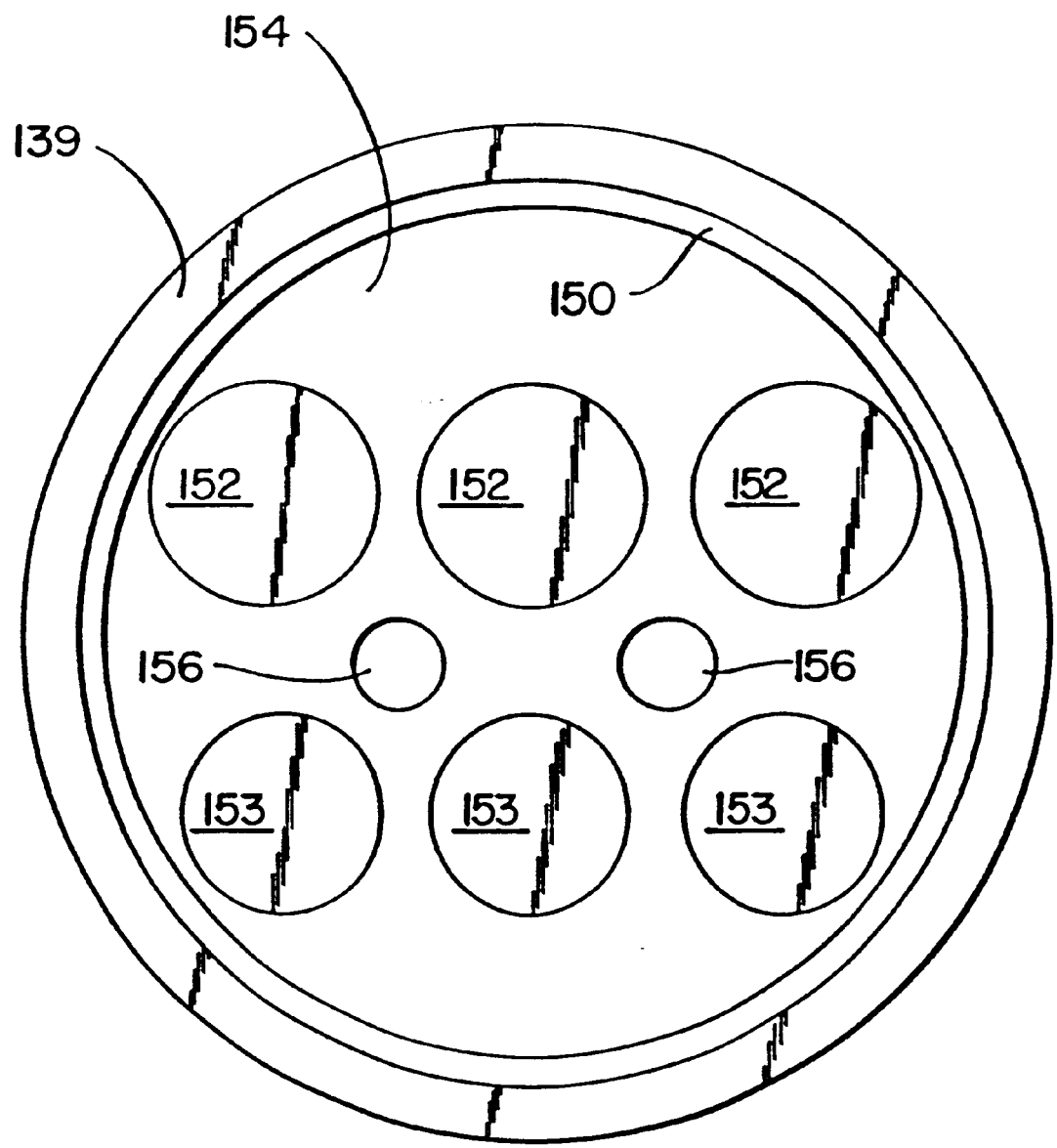
FIG. 24 is a plan view of a portion of a cylinder head.
Figure 25:
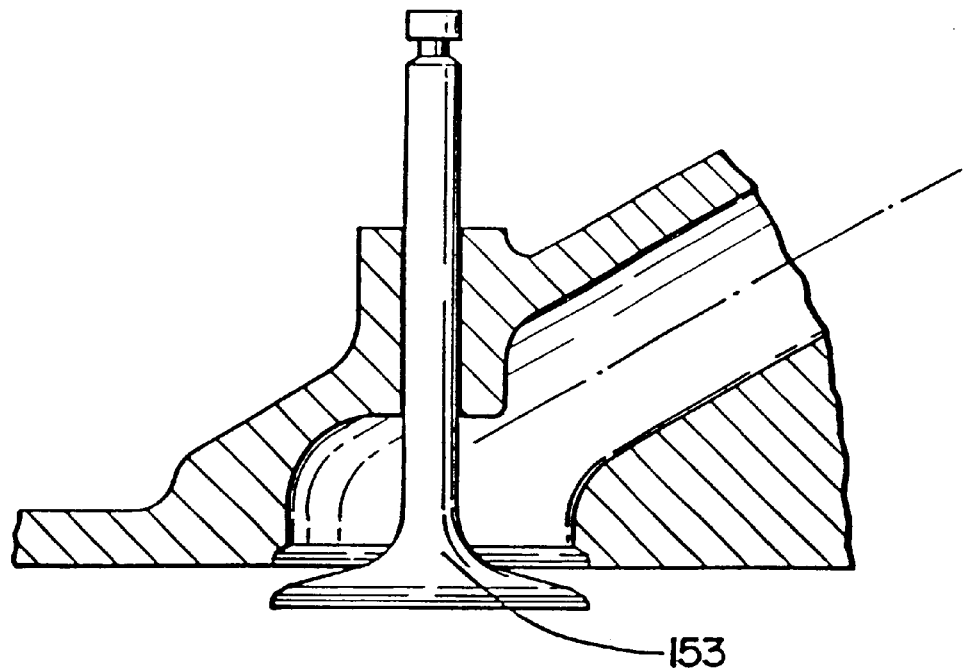
FIG. 25 is an elevation of an exhaust valve and gas port embodying the present invention.

As shown in FIG. 24, in the present example of a preferred embodiment of the present invention, three intake valves 152 and three exhaust valves 153 are provided per cylinder head 154. Spark plugs 156 are shown in FIG. 22 for reference. The use of six valves, combined with the low RPM of the engine enables the cylinder head of the present invention to perform using a very small opening under the valve. As valves are lifted only a short distance and are elliptical or flattened ports to induce tangential gas flow. Six valves generate a large contact area relative to the overall valve mass and area. Thus, the design of the valves in the present invention enable rapid heat transfer from the valve to the head.

Figure 26:
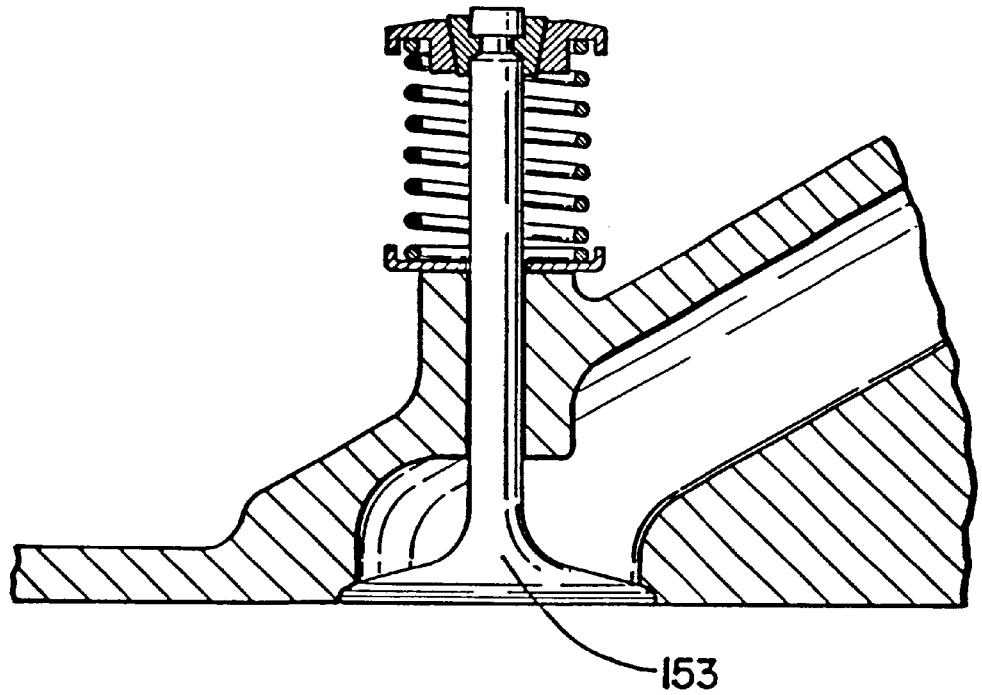
FIG. 26 is an elevation of the exhaust valve and gas port also showing a valve retraction mechanism and a valve in a cylinder head.

Turning now to FIG. 26, the configuration of the ports is such that all surfaces may be machined with standard milling bits operating from an axis parallel to the valve axis and parallel to the port axis. The shape and angle of the valve housing is such that small valve openings enable gas flow which reacts to the valve more as a streamline rather than as a 90° impediment. The entire head above the combustion chamber is pressurized with cooling oil, thus the valve stem spring and cam follower mechanism are immersed in coolant. The flattened or elliptical ports allow for a short heat path to the coolant, as shown in FIG. 26.

FIG. 27 shows the crank case engine half, guide key 82. While an example of a preferred embodiment of the present invention has been presented, it is not in tended to limit the spirit or scope of the invention. Variations of the preferred embodiment are possible while remaining within the scope of the claimed invention.

What is claimed:

1. An internal combustion engine comprising at least one engine block with journals for supporting a crankshaft, characterized in that:

the block comprises first and second sections joined on a plane normal to a rotational axis of the crankshaft, each containing opposing first hollowed areas that define a closed crankcase when the first and the second sections are joined and second opposed hollowed areas define a space for a cylinder liner when the first and second sections arc joined, and each section containing a journal for the crankshaft; and wherein the first section contains a scat extending around surface facing the second section for receiving an o-ring.

2. The internal combustion engine of claim 1, further characterized in that one of first section or second section contains identically tapped holes and a second of the first or second sections contains holes aligned with said tapped holes.

3. The internal combustion engine of claim 1, further characterizes in that the first and second sections contain mirrored grooves at an upper portion of the second hollowed area and a planar cylinder head with said grooves.

4. An internal combustion engine comprising at least one engine block with journals for supporting a crankshaft, characterized in that:

the block comprises first and second sections joined on a plane normal to a rotational axis of the crankshaft, each section containing opposing first hollowed areas that define a closed crankcase when the first and the second sections are joined and second opposed hollowed areas define a space for a cylinder liner when the first and second sections are joined, and each section containing a journal for the crankshaft; and wherein at least two of said engine blocks are coupled crankshafts, each block containing a pump for both combined lubrication and cooling.

5. An internal combustion engine comprising:

at least one engine block with journals for supporting a crankshaft, characterized in that the block comprises first and second sections joined on a plane normal to a rotational axis of the crankshaft, each containing opposing first hollowed areas that define a closed crankcase when the first and the second sections are joined and second opposed hollowed areas define a space for a cylinder liner when the first and second sections are joined, and each section containing a journal for the crankshaft; and wherein the first and second sections contain mirrored grooves at an upper portion of the second hollowed area and a planar cylinder head with said grooves.

6. An internal combustion engine comprising:

at least one engine block with journals for supporting a crankshaft, characterized in that the block comprises first and second sections joined on a plane normal to a rotational axis of the crankshaft, each containing opposing first hollowed areas that define a closed crankcase when the first and the second sections are joined and second opposed hollowed areas define a space for a cylinder liner when the first and second sections are joined, and each section containing a journal for the crankshaft;

a cam shaft; and a cam follower comprising at least one guide rail oriented normal to the axis of the cam shaft and engaging a rail guide slot in one of the sections.

7. An internal combustion engine comprising:

at least one engine block with journals for supporting a crankshaft, characterized in that the block comprises first and second sections joined on a plane normal to a rotational axis of the crankshaft, each containing opposing first hollowed areas that define a closed crankcase when the first and the second sections are joined and second opposed hollowed areas define a space for a cylinder liner when the first and second sections are joined, and each section containing a journal for the crankshaft;

a piston in said space for said cylinder liner;

a connecting rod attached to the piston;

piston guide means, engaging the piston and a wall of one of the first and second sections, for guiding the piston; and wherein said piston guide means engages a post on said one of the first and second sections.

8. The internal combustion engine of claim 7, further characterized in that:

said guide means contains a slot that receives said post, said slot extending for selected distance in a direction of piston movement.

9. The internal combustion engine of claim 8, further characterized in that:

said guide means comprise a L-shaped arm with a first surface normal to the direction of piston movement and a second surface parallel to the direction of piston movement and contains said slot.

10. The internal combustion engine of claim 9, further characterized in that:

the piston is pan-shaped.

11. The internal combustion engine of claim 10, further characterized by: a piston guide plate attached to a bottom surface of the piston for engaging said space for said cylinder liner.

12. The internal combustion engine of claim 11, further characterized in that:

said guide means is attached to said bottom of the piston by fasteners that extend through said guide plate.

13. The internal combustion engine of claim 12, further characterized by:

a connecting rod gin on a bottom of the piston;

a connecting rod having a bearing surface that engages said connecting rod pin and contains a connecting rod support surface along the perimeter of said connecting rod support surface;

the guide means contains a journal to receive said connecting rod support surface; and said fasteners hold said journal against said connecting rod support surface, engaging said connecting rod rearing surface and said connecting rod pin.

14. An internal combustion engine comprising:

at least one engine block with journals for supporting a crankshaft, characterized in that the block comprises first and second sections joined on a plane normal to a rotational axis of the crankshaft, each containing opposing first hollowed areas that define a closed crankcase when the first and the second sections are joined and second opposed hollowed areas define a space for a cylinder liner when the first and second sections are joined, and each section containing a journal for the crankshaft;

a piston in said space for said cylinder liner;

a connecting rod attached to the piston;

piston guide means, engaging the piston and a wall of one of the first and second sections, for guiding the piston;

wherein said piston is pan-shaped; and a piston guide plate attached to a bottom surface of the piston for engaging the space for said cylinder liner.

15. The internal combustion engine of claim 14, further characterized in that:

said guide means is attached to said bottom of the piston by fasteners that extend through said guide plate.

16. The internal combustion engine of claim 15, further characterized by:

a connecting rod pin on a bottom of the piston;

a connecting rod having a bearing surface that engages said connecting rod pin and contains a connecting rod support surface along the perimeter of said connecting rod support surface;

the guide means contains a journal to receive said connecting rod support surface; and said fasteners hold said journal against said connecting rod support surface, engaging said connecting rod rearing surface and said connecting rod pin.

\* \* \* \* \*